(12) United States Patent
Hosaka et al.

(10) Patent No.: US 8,908,487 B2
(45) Date of Patent: Dec. 9, 2014

(54) OPTICAL INFORMATION REPRODUCING APPARATUS AND OPTICAL INFORMATION REPRODUCING METHOD

(75) Inventors: Makoto Hosaka, Fujisawa (JP); Toshiki Ishii, Yokohama (JP)

(73) Assignee: Hitachi Consumer Electronics Co., Ltd., Tokyo (JP)

(*) Notice: Subject to any disclaimer, the term of this patent is extended or adjusted under 35 U.S.C. 154(b) by 0 days.

(21) Appl. No.: 13/305,797

(22) Filed: Nov. 29, 2011

(65) Prior Publication Data
US 2012/0163152 A1 Jun. 28, 2012

(30) Foreign Application Priority Data
Dec. 27, 2010 (JP) ................. 2010-289119

(51) Int. Cl.
*G11B 7/0065* (2006.01)
*G11B 7/007* (2006.01)

(52) U.S. Cl.
CPC .......... *G11B 7/0065* (2013.01); *G11B 7/00772* (2013.01); *G11B 2220/2504* (2013.01)
USPC .............................. 369/103; 359/1

(58) Field of Classification Search
USPC .................. 369/103; 359/1; 365/216
See application file for complete search history.

(56) References Cited

U.S. PATENT DOCUMENTS

| | | | | |
|---|---|---|---|---|
| 8,107,145 B2 * | 1/2012 | Hara | ................................ | 359/22 |
| 8,275,216 B2 * | 9/2012 | Ayres et al. | .................... | 382/294 |
| 2005/0147020 A1 * | 7/2005 | Van Someren et al. | .... | 369/275.4 |
| 2005/0286388 A1 * | 12/2005 | Ayres et al. | .................... | 369/103 |
| 2007/0065019 A1 * | 3/2007 | Yasuda et al. | ................. | 382/232 |
| 2007/0091747 A1 * | 4/2007 | Ueno | ......................... | 369/47.28 |
| 2008/0144147 A1 * | 6/2008 | Hara et al. | ........................ | 359/3 |
| 2008/0310281 A1 * | 12/2008 | Hara et al. | ..................... | 369/103 |
| 2009/0010133 A1 * | 1/2009 | Lee et al. | ....................... | 369/103 |
| 2011/0007620 A1 * | 1/2011 | Knittel et al. | ................. | 369/103 |
| 2011/0273976 A1 * | 11/2011 | Higashino | .................. | 369/59.24 |
| 2011/0276990 A1 * | 11/2011 | Higashino | ..................... | 720/718 |

FOREIGN PATENT DOCUMENTS

| | | |
|---|---|---|
| JP | 2004-272268 | 9/2004 |
| JP | 2006-267539 | 10/2006 |
| JP | 2008-536158 | 9/2008 |
| WO | WO 2004/102542 A1 | 11/2004 |
| WO | WO 2006-093945 | 9/2006 |

OTHER PUBLICATIONS

Japanese Office Action dated Sep. 17, 2013 for Application No. 2010-289119.

\* cited by examiner

*Primary Examiner* — Thomas Alunkal
(74) *Attorney, Agent, or Firm* — Antonelli, Terry, Stout & Kraus, LLP.

(57) ABSTRACT

In reproduction of a two-dimensional page data from an optical information recording medium utilizing holography, a reproduced two-dimensional page data is divided into a plurality of areas each of which has a predetermined size, the divided two-dimensional areas are individually subjected to adaptive equalizing, and then are coupled to restore the condition of the original two-dimensional page data.

18 Claims, 18 Drawing Sheets

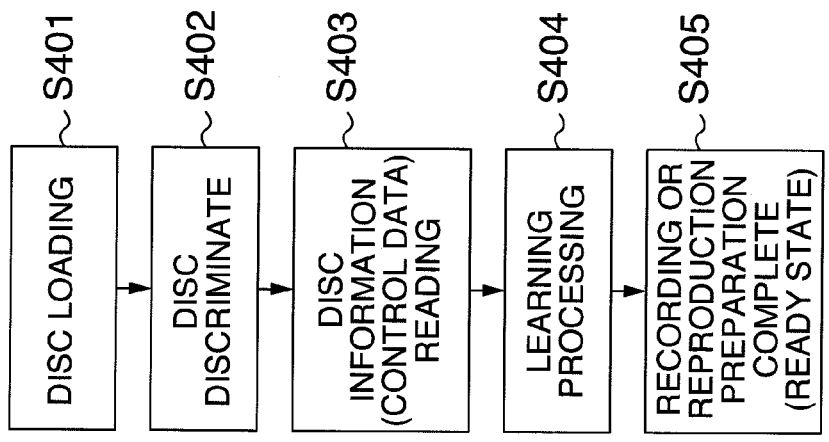
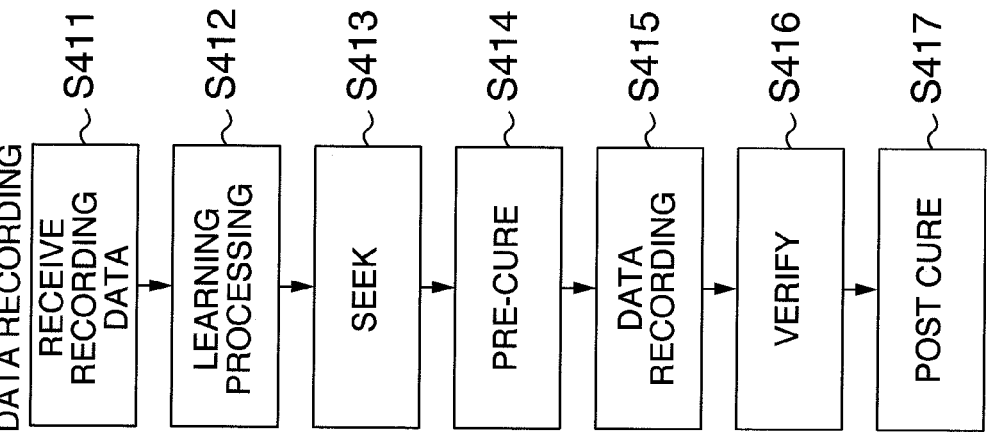
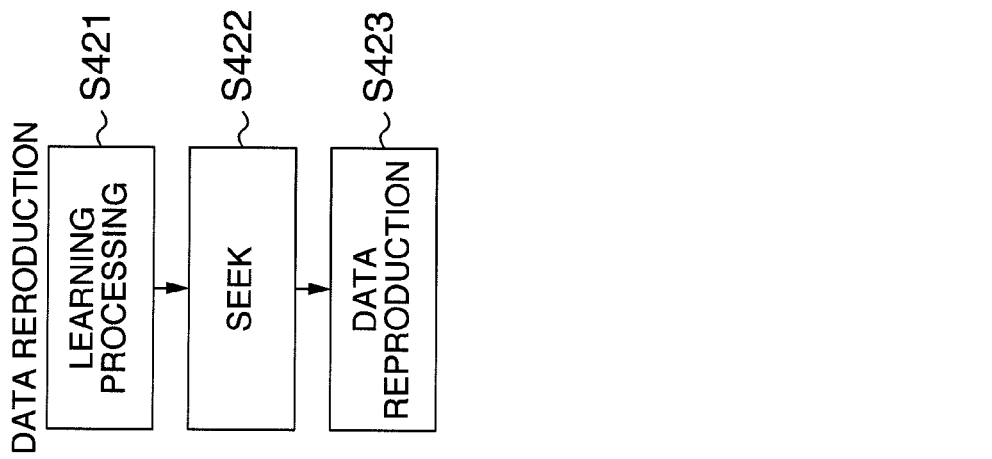

FILTER AREA(3X3)

FIG. 10A
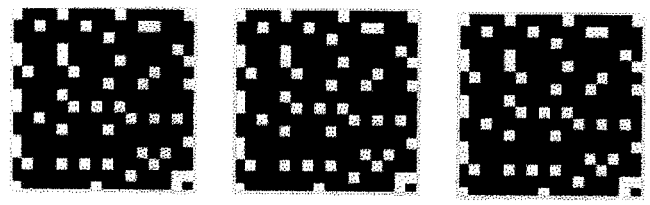
DIVIDED AREAS CLOSE IN
SIGNAL QUALITY
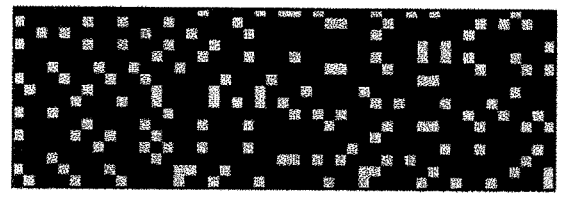
EXPAND AREA BY COLLECTING
FIG. 10B
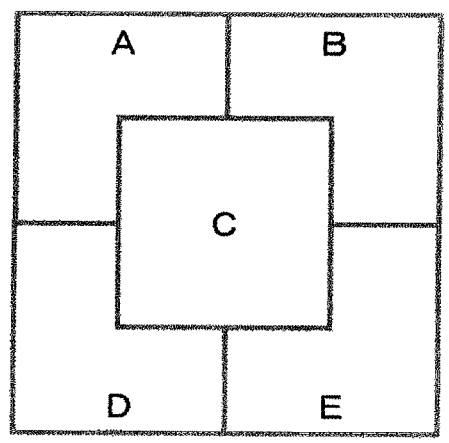

OPTICAL INFORMATION REPRODUCING APPARATUS AND OPTICAL INFORMATION REPRODUCING METHOD

INCORPORATION BY REFERENCE

The present application claims priority from Japanese application JP2010-289119 filed on Dec. 27, 2010, the content of which is hereby incorporated by reference into this application.

BACKGROUND OF THE INVENTION

The present invention relates to an apparatus and method for reproducing information from an optical information recording medium, using holography.

Currently, based on Blu-ray Disc (BD) standard using a blue-violet semiconductor laser, an optical disc having a recording density of as large as 50 GB may be commercialized even for consumer use. In the future, optical discs are desired to provide a large capacity comparable to the capacity of a HDD (hard disc drive) such as 100 GB to 1 TB. However, in order to realize such an optical disc of ultra-high density, a high-density architecture technology of a new system is required which is different from the conventional high-density technology including decreasing the wavelength and making the NA (numerical aperture) ratio of objective lens higher.

During researches relating to a next-generation storage technology having been made a holographic recording technology recording digital information using holography has been paid to attention. The holographic recording technology is defined such that a signal light having information of page data two-dimensionally modulated by a spatial light modulator is superimposed on a reference light within an optical information recording medium, and a pattern of interference fringes resulting at the superimposition causes a modulation in the refraction index of the optical recording medium to thereby record the information on the optical information recording medium.

When reproducing the information, the same reference light as used in the recording is irradiated to the optical information recording medium. At this time, a hologram recorded in the optical information recording medium functions like a holographic diffraction grating and so, the same light as the recorded signal light including phase information is reproduced as a diffracted light. The reproduced light is two-dimensionally detected fast using a light detector (photodetector) such as a CMOS or CCD. In this manner, the holographic recording technology allows two-dimensional information to be recorded on the optical light recording medium by once and further the recorded information to be reproduced. In addition, the holographic recording technology allows a plurality of two-dimensional data to be multiplex-recorded on one position of the optical information recording medium, thereby making it possible to achieve recording and reproduction of high-speed and large-capacity information.

As the holographic recording technology for example, JP-A-2004-272268 is published. This publication discloses a so-called angle-multiplex recording system, in which signal light fluxes are collected on an optical information recording medium by a lens, and at the same time a reference light of parallel fluxes is irradiated on the recording medium to interfere with each other thereby performing holographic recording on the recording medium, and further a different page data is multiplex-recorded with an incident angle of the reference light to the optical information recording medium being changed, by indicating the page data on a spatial light modulator. In addition, the JP-A-2004-272268 discloses collecting the signal light by the lens and arranging the aperture (spatial filter) to the beam waist of the collected light, so that the spacing between adjacent holograms may be made shorter to thereby increase the recording density and the storage capacity of the recording medium compared with the prior art angle-multiplex recording system.

For another holographic recording technology, for example, WO2004-102542 is published. This publication discloses an example using a shift multiplex system in which in one spatial light modulator, light from an inner pixel is used as a signal light, and light from an outer pixel is used as a reference light, both fluxes are collected on the optical information recording medium by the same lens, and the signal light and the reference light are subjected to interference around a focal plane of the lens to thereby record the hologram.

As an equalizing technology in hologram reproduction, for example, JP-A-2006-267539 is published. This publication discloses an art in which in order to effectively remove intersymbol interference which an attention pixel receives from the surrounding pixels filter coefficients are selected based on a binarized-data pattern by which a temporal determination is made.

SUMMARY OF THE INVENTION

In a two-dimensional data called "a page which is reproduced from a hologram" there is a problem to be solved that the aspect of intersymbol interference is different depending upon the position within the page to make the quality of reproduction different within the page.

To solve the above-mentioned problem, a page-adaptive equalizing processing of making the filter coefficient adaptive for a different page has been conventionally reported. However, the equalizing processing still has a problem that since one filter coefficient is calculated from one page, it is difficult to satisfactorily cope with the difference in the intersymbol interference within the same page. According to the equalizing processing disclosed in JP-A-2006-267539 the filter coefficient is changed depending upon the condition of the adjacent pixels, and the filter coefficient is determined only by the ON/OFF state of the adjacent pixels. However, the prior art publication inherently has not taken into consideration the difference of the intersymbol interference within the page and so, is difficult to successfully solve the above-mentioned problem, like the conventional approach.

The object of the present invention is to perform an equalizing processing adaptive for the difference of the quality of reproduction depending upon the position within a reproduced page to thereby improve the signal quality of the entire page.

The object of the present invention is solved by as one example, in reproducing a two-dimensional page data from an optical information recording medium, dividing the reproduced two-dimensional page data into a plurality of areas, adaptively equalizing the divided two-dimensional areas individually, and coupling the adaptively equalized two-dimensional areas so as to restore the condition of the original two-dimensional page data.

According to the present invention, a page is divided into a plurality of areas and is adaptively equalized, so that the difference in the aspect of intersymbol interference depending upon the position within the same page can be effectively removed.

Other objects, features and advantages of the invention will become apparent from the following description of the embodiments of the invention taken in conjunction with the accompanying drawings.

BRIEF DESCRIPTION OF THE DRAWINGS

FIGS. 4A to 4C are flow diagrams showing an embodiment of operation flow of the optical information recording and reproducing apparatus, respectively.

FIGS. 10A and 10B are illustrations showing an example of a method for coupling divided areas in Embodiment 2.

DETAILED DESCRIPTION OF THE EMBODIMENTS

In the following, description will be made of the embodiments of the present invention.

Figure 1:
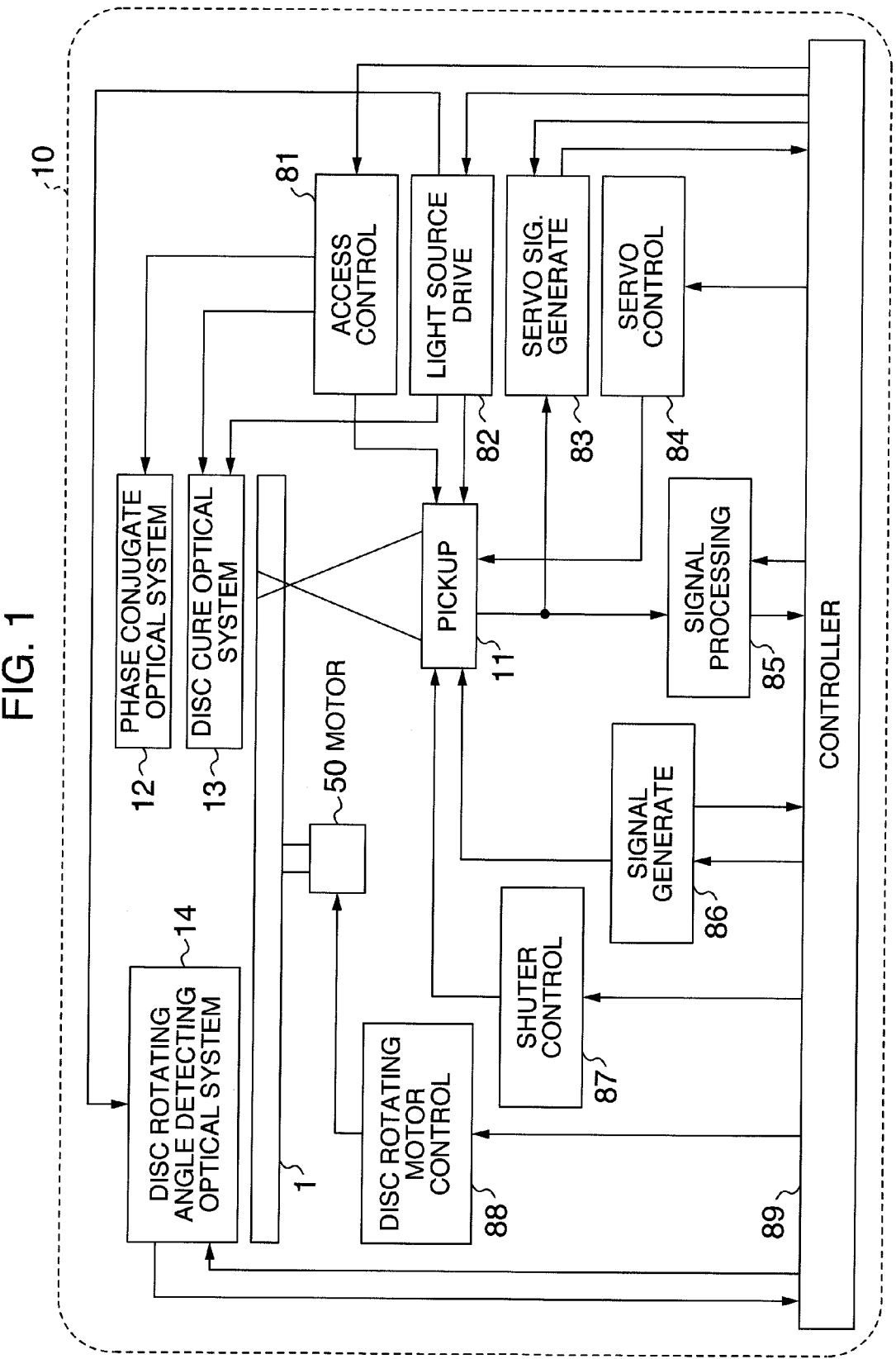
FIG. 1 is a constructional block diagram of an optical information recording and reproducing apparatus according to one embodiment of the present invention.

The embodiments of the present invention will be described with reference to the accompanying drawings. FIG. 1 is a block diagram showing an optical information recording and reproducing apparatus which records and/or reproduces digital information utilizing holography.

An optical information recording and reproducing apparatus 10 includes a pickup 11, a phase conjugate optical system 12, a disc Cure optical system 13, a disc rotating angle detecting optical system 14 and a rotating motor 50. An optical information recording medium 1 is configured to be rotatable by the rotating motor 50.

The pickup 11 plays a role to emit a reference light and a signal light to the optical information recording medium 1 and record digital information on the recording medium 1 utilizing holography. At this time, the recorded digital information signal is sent to a spatial light modulator within the pickup 11 by a controller 89 through a signal generating circuit 86, and then the signal light is modulated by the spatial light modulator.

When reproducing information recorded on the optical information recording medium 1 a phase conjugate light of a reference light emitted from the pickup 11 is generated in the phase conjugate optical system 12. Here, the phase conjugate light is defined to be a light wave which propagates in the direction opposite to that of an input light with the same plane as the input light being kept. A reproduced light reproduced by the phase conjugate light is detected by a light detector referred to hereafter and provided within the pickup 11, and then a signal is reproduced by a signal processing circuit 85 from the detected light.

The irradiating time for irradiating reference light and signal light to the optical information recording medium 1 may be adjusted by controlling the on/off time of a shutter within the pickup 11 by the controller 89 through a shutter controlling circuit 87.

The disc cure optical system 13 plays a role to generate a light beam used for pre-cure and post-cure of optical information recording medium 1. The pre-cure is defined as a pre-process of irradiating, when recording information on a desired position within optical information recording medium 1, the desired position with a predetermined light beam before irradiating the desired position with reference light and signal light. The post-cure is defined as a post-process of irradiating a desired position within optical information recording medium 1 with a predetermined light beam in order to prevent overwriting on the desired position after recording information thereon.

The disc rotating angle detecting optical system 14 is used to detect a rotating angle of optical information recording medium 1. When adjusting the optical information recording medium 1 at a predetermined rotating angle the disc rotating angle detecting optical system 14 detects a signal corresponding to the rotating angle, and the controller 89 can control the rotating angle of the recording medium 1 through a disc rotating motor controlling circuit 88 using the detected signal.

A light source drive circuit 82 feeds a predetermined light source driving current to light sources within the pickup 11, the disc cure optical system 13 and the disc rotating angle optical system 14. Each of the light sources is capable of emitting a light beam with a predetermined light quantity.

The pickup 11 and the disc cure optical system 13 are provided with a mechanism which makes them slidable in position in the radial direction of the optical information recording medium 1, so that the position control may be performed through an access control circuit 81.

Recording technology utilizing the principle of angle multiplexing of holography tends to make considerably small the permissible error to a difference in the reference light angle.

It is therefore required to provide a mechanism for detecting the quantity of difference of the reference light angle within the pickup 11 and a servo mechanism associated therewith in the optical information recording and reproducing apparatus in which a servo signal generating circuit 83 generates a signal for servo control to thereby correct the quantity of difference through a servo controlling circuit 84.

The pickup 11, the disc cure optical system 13 and the disc rotating angle detecting optical system 14 may be simplified such that some or whole of them are configured by one optical system.

Figure 2:
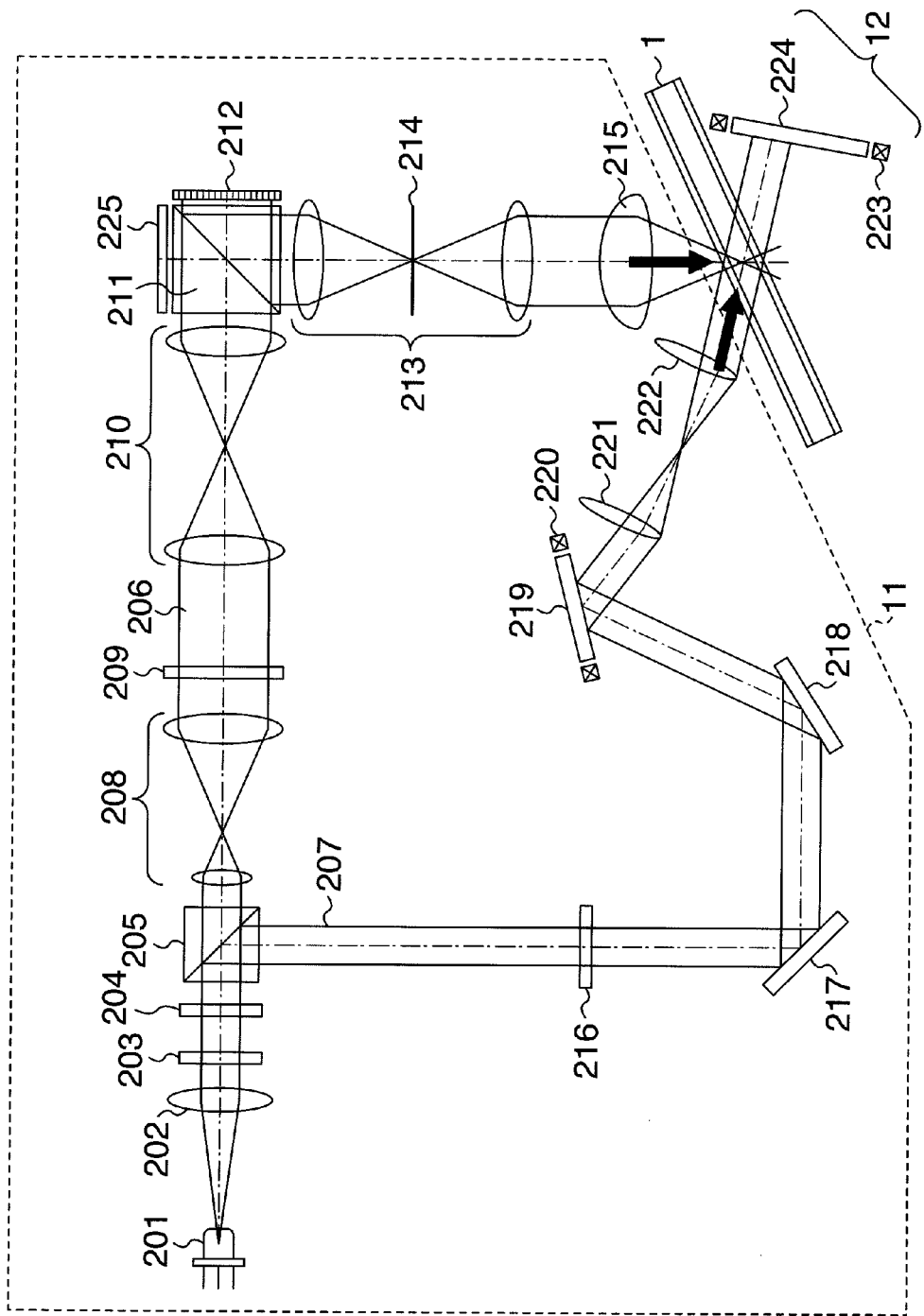
FIG. 2 is an illustration showing an embodiment of a pickup within the optical information recording and reproducing apparatus (when recording).

FIG. 2 shows a recording principle in an example of a basic optical system configuration of pickup 11 in the optical information recording and reproducing apparatus 10. A light beam emitted from a light source 201 passes through a collimated lens 202 into a shutter 203. When the shutter 203 is open the light beam having passed through the shutter 203 is controlled relative to polarizing direction by an optical element 204 formed of, for example, a ½ wavelength plate such that the ratio in light quantity between p-polarization and s-polarization may be a predetermined ratio, and then enters a PBS (Polarization Beam Splitter) prism 205.

The light beam having passed through the PBS prism 205 serves as a signal light 206, the light beam is diametrically expanded by a beam expander 208, is passed through a phase mask 209, a relay lens 210 and a PBS prism 211, and enters a spatial light modulator 212.

The signal light to which information is added by the spatial light modulator 212 is reflected in the PBS prism 211, and propagates in the relay lens 213 and a spatial filter 214. Thereafter, the signal light is collected on the optical information recording medium 1 by an objective lens 215.

On the other hand, the light beam reflected in the PBS prism 205 serves as a reference light 207, is set in a polarized direction predetermined according to recording or reproducing by a polarizing direction converting element 216, and then is passed through a mirror 217 and a mirror 218 into a galvanic-mirror 219. The galvanic-mirror 219 can be adjusted in its angle by an actuator 220, so that the reference light incident on the optical information recording medium 1 after passed through a lens 221 and a lens 222 can be set in a desired incident angle. Here, in order to set the incident angle of the reference light, an element for converting the wave-front of reference light may be used in pace of the galvanic-mirror.

In this manner, the signal light and the reference light are entered to be superimposed on each other in optical information recording medium 1, so that a pattern of interference fringes is formed within the optical information recording medium 1. This pattern is written into the optical information recording medium to thus record information. The galvanic-mirror 219 can change the incident angle of reference light incident on the optical information recording medium 1, thus making it possible to provide angle-multiplexing recording.

Hereafter, in holograms recorded on the same area by changing the angle of reference light, a hologram corresponding to a different angle of reference light is referred to as a "page" and a set of pages angle-multiplexed on the same area is referred to as a "book".

Figure 3:
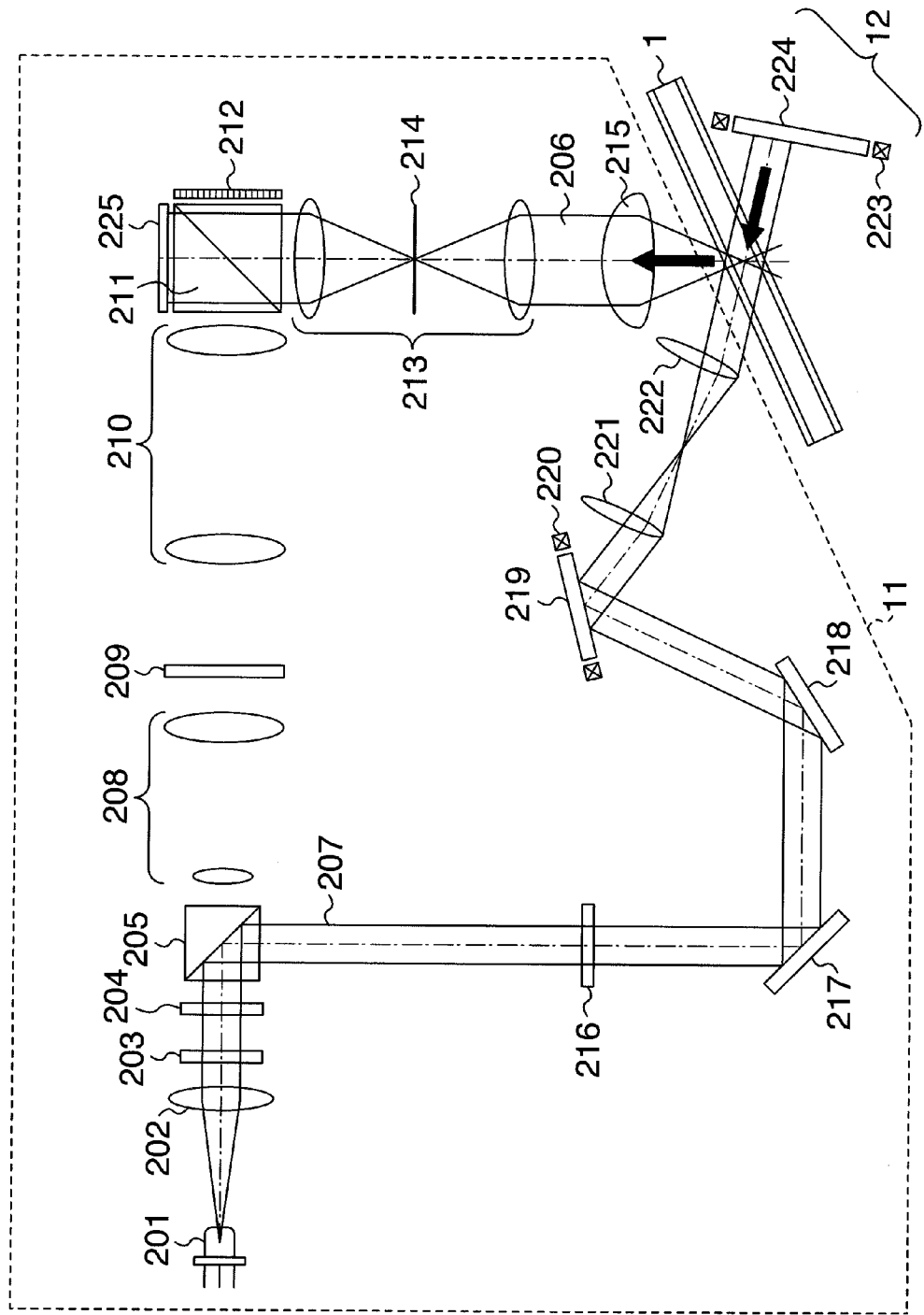
FIG. 3 is an illustration showing an embodiment of a pickup within the optical information recording and reproducing apparatus (when reproducing).

FIG. 3 shows a reproducing principle in an example of a basic optical system configuration of pickup 11 in the optical information recording and reproducing apparatus 10. When reproducing recorded information a reference light is entered to the optical information recording medium 1 as mentioned above, a light beam passed through the recording medium 1 is reflected by a galvanic-mirror 224 capable of adjusting its angle by an actuator 223 to generate a phase conjugate light thereof.

A signal light reproduced by the phase conjugate light propagates through the objective lens 215, the relay lens 213 and the spatial filter 214. After then, the signal light passes through the PBS prism 211 and enters a light detector 225 to allow the recorded signal to be reproduced.

FIGS. 4A-4C show operation flows of recording and reproduction in optical information recording and reproducing apparatus 10. Particularly, flows concerning recording and reproduction utilizing holography will be described here.

FIG. 4A shows an operation flow of from loading of the optical information recording medium 1 on the optical information recording and reproducing apparatus 10 to completion of preparation of recording or reproducing. FIG. 4B shows an operation flow of from the condition of the preparation completion to information recording into the optical information recording medium 1, and FIG. 4C shows an operation flow of from the condition of the preparation completion to reproducing of recorded information on the optical information recording medium 1.

When the recording medium is loaded on the optical information recording and reproducing apparatus 10 (S401) as shown in FIG. 4A, the apparatus 10 discriminates a disc as the medium as to whether, for example, the loaded medium is a medium for recording or reproducing digital information utilizing holography (S402).

As a result of disc discrimination, if it is determined that the medium is the optical information recording medium 1 for recording or reproducing digital information utilizing holography, the optical information recording and reproducing apparatus 10 reproduces control data provided in the optical information recording medium (S403), and acquires, for example, information concerning the optical information recording medium and information concerning different kinds of setting conditions at the time of recording or reproduction.

After the control data is reproduced different kinds of adjustments responsive to the control data and a learning processing relating to pickup 11 are performed (S404). The optical information recording and reproducing apparatus 10 completes the preparation of recording or reproducing (S405).

As the operation flow of from the preparation completion condition to recording of information is shown in FIG. 4B, first of all, a data to be recorded is received (S411), and information corresponding to the data is sent to the spatial light modulator within pickup 11.

Thereafter, in order to record information of high quality on an optical information recording medium different kinds of learning processing is previously performed when required, (S412), and the pickup 11 and disc cure optical system 13 are positioned at predetermined positions of the optical information recording medium by a seek operation (S413).

After then using a light beam emitted from the disc cure optical system 13 a predetermined area is pre-cured, (S414), and using a reference light and a signal light emitted from the pickup 11 a data is recorded (S415).

After the data is recorded the data is verified when required (S416) and a post cure is performed (S417) using a light beam emitted from the disc cure optical system 13.

As the operation flow of from the preparation completion condition to reproduction of recorded information is shown in FIG. 4C, in order to reproduce information of high quality from the optical information recording medium different kinds of learning processing is previously performed when required (S421). Then, the pickup 11 and phase conjugate optical system 12 are positioned at predetermined positions of the optical information recording medium by a seek operation (S422).

After then the reference light is emitted from the pickup 11, and thereby information recorded in the optical information recording medium is reproduced (S423). The present invention is applied as means for enhancing the quality of signal in reproducing the information.

Detailed description of embodiments of the present invention will be made in the following.

Embodiment 1

Figure 5:
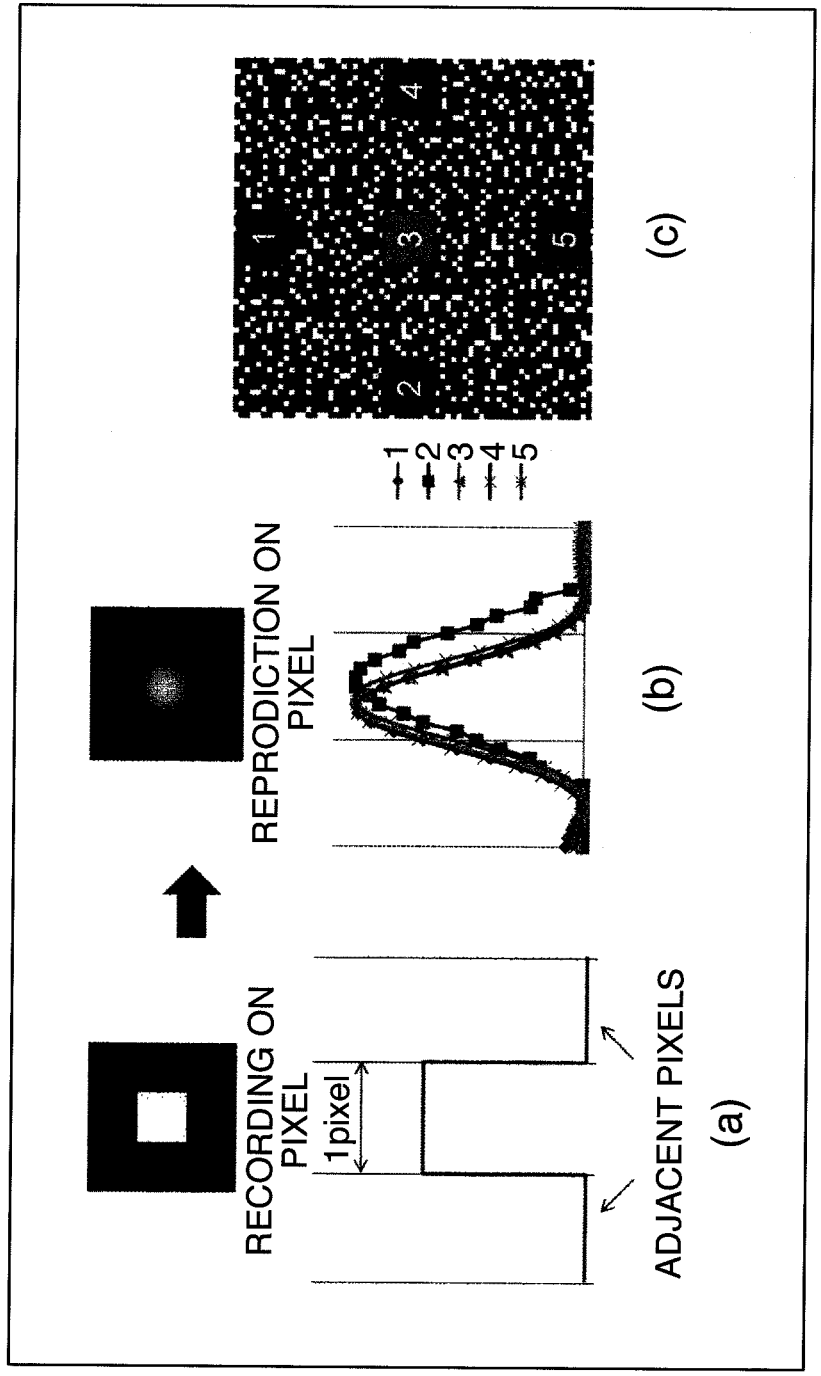
FIG. 5 is illustrations showing the difference in the quality of reproduction within the same page by way of example.

Description of the outline will be made on the validity of dividing a page into a plurality of areas and performing adaptive equalizing to every divided area. FIG. 5 schematically shows the difference in reproduction quality depending upon the positional difference within the same page. In illustrations (a) of FIG. 5, when black-colored OFF pixels surround a white-colored ON pixel as shown in an upper-side illustration (a) of the Figure, a spatial light modulator in recording indicates the ON pixel and the OFF pixels adjacent thereto in the form of binary signal as shown in a lower-side illustration (a) of FIG. 5. However, when recording the signal on an optical information recording medium in the form of a hologram and looking at a reproduction signal from the recorded signal, it is found that an intersymbol interference occurs due to leakage of the signal into the adjacent OFF pixels from the ON pixel, as shown in an upper-side illustration (b) of FIG. 5. This is because the aperture (spatial filter) shrinking the waist of the beam described in JP-A-2004-272268 eliminates high-frequency components, where the smaller the size of the aperture is, the larger the intersymbol interference becomes.

The above-mentioned intersymbol interference may change the state of the interference depending upon the position within the page due to external complex disturbances, such as aberration of lens, wavelength difference of laser or disc-tilt or the like. When a page reproduced from a certain hologram is divided into five areas as shown in illustration (c) of FIG. 5, and the difference in leakage of ON pixel into OFF pixels adjacent thereto is observed for each divided page area, it is found that the state of the interference is different depending upon the positional difference within the page as shown in the lower-side illustration (b) of FIG. 5. Thus, it is difficult to satisfactorily cope with the difference in the intersymbol interference within the same page, by the prior art page-adaptive equalizing in which one filter coefficient is determined to one page. By contrast, the present invention is effective and valid in which one page is divided into plural areas and each divided area is subjected to adaptive equalization.

Figure 6A:
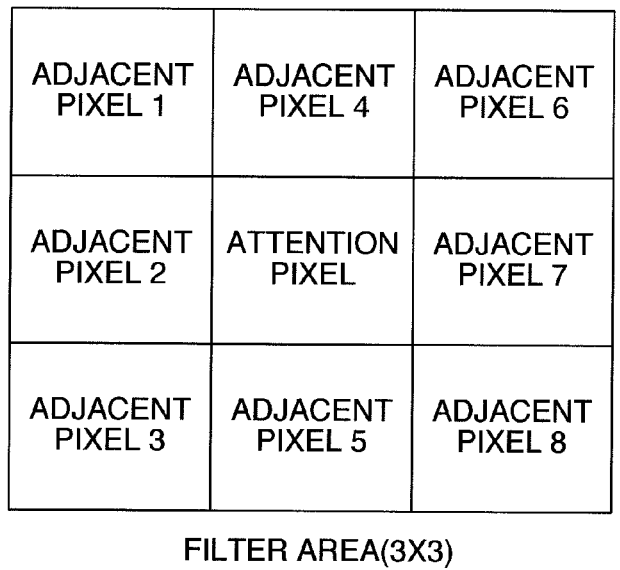
FIG. 6A is an illustration showing one example of an area subjected to filtering.
Figure 6B:
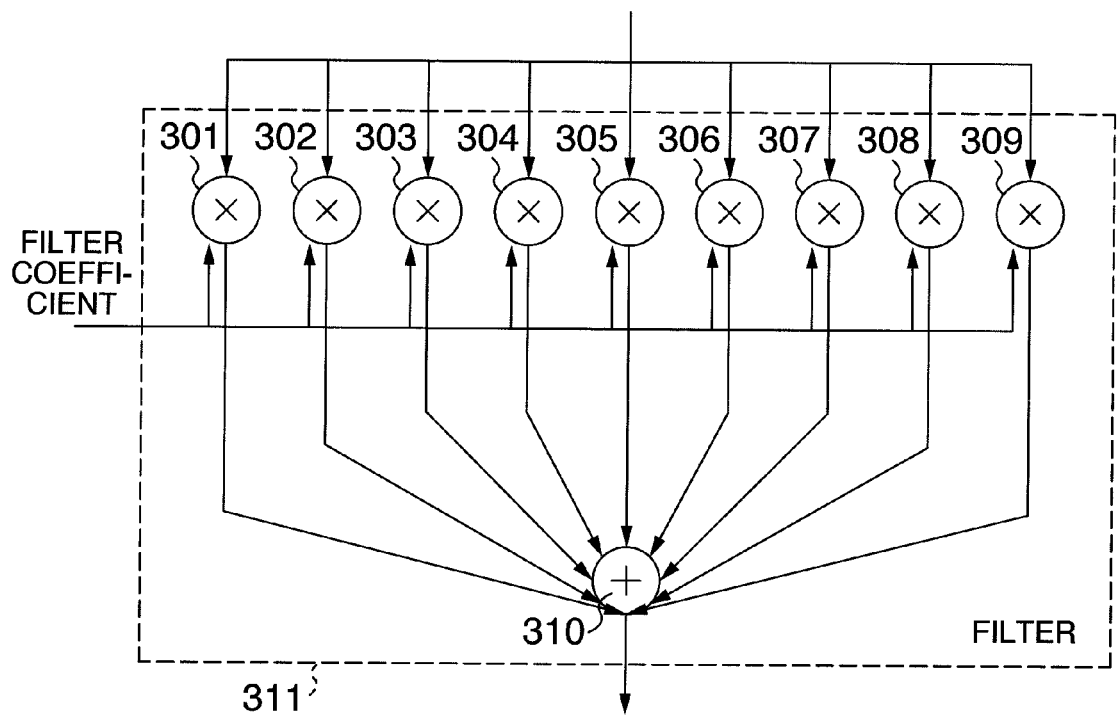
FIG. 6B is a circuit diagram showing one example of FIR filter.

FIGS. 6A and 6B show an example of FIR filter processing for two-dimensional pixels. As shown in, for example, FIG. 6A, let us consider to process, by filtering, the luminance value of a pixel of interest (hereinafter referred to as "attention pixel") centrally located in 3×3 areas to be filtered. In the filtering process, as shown in FIG. 6B, the respective luminance values of the attention pixel and the adjacent pixels 1-8 are multiplied by filter coefficients using multiplier circuits 301 to 309, and all multiplied luminance values are summed up by an adder circuit 310 to thereby calculate the luminance value after filtering. It is natural that when the 3×3 areas are assumed to be filtered nine filter coefficients are required in value. It is to be noted that the present invention should not be limited to 3×3 filter areas and any number of filter areas may be used.

Figure 7:
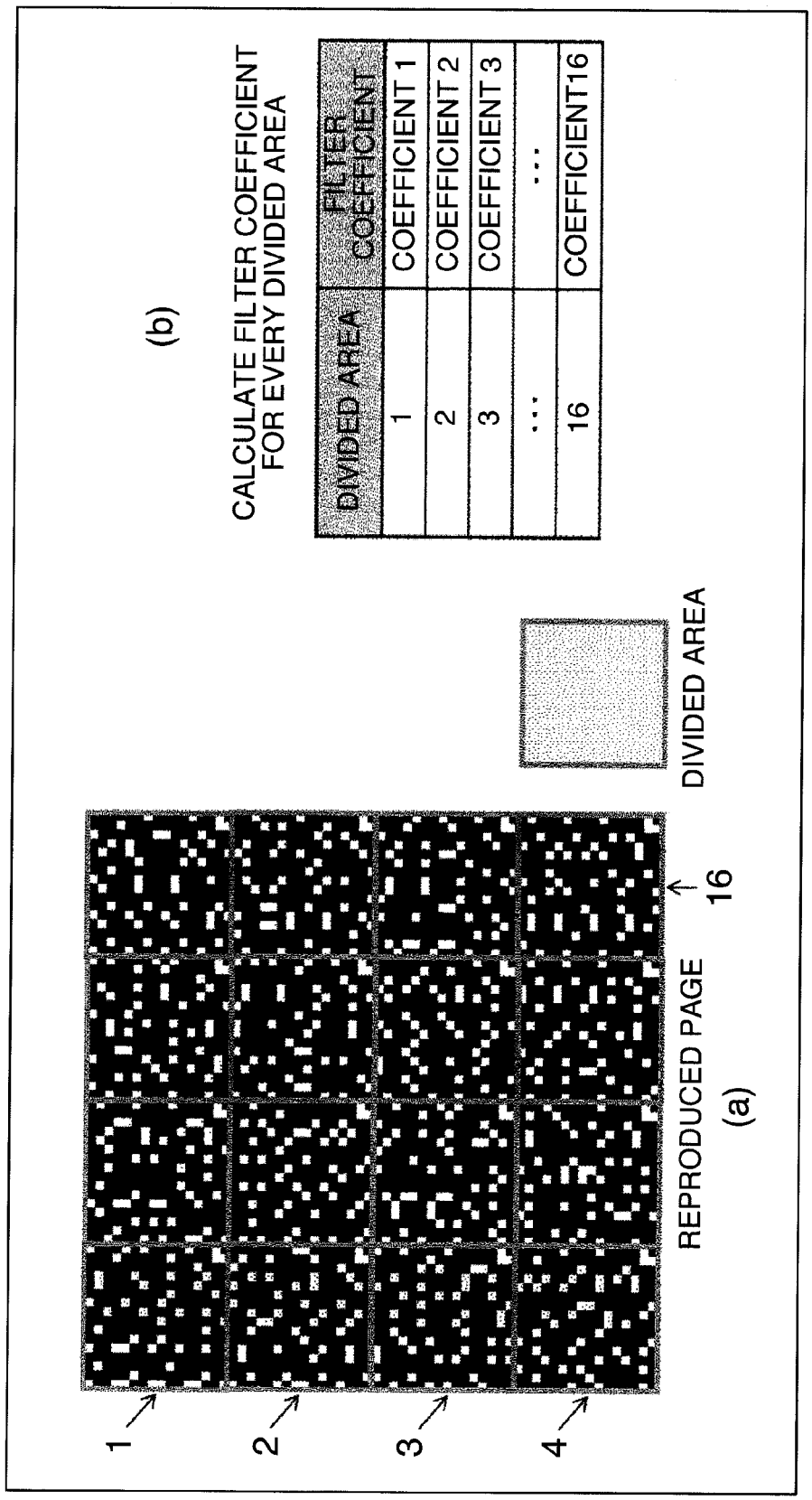
FIG. 7 is illustrations showing one example of page division when calculating a set of filter coefficients for divided page.

FIG. 7 shows an example of a method for dividing a page in accordance with Embodiment 1. When a reproduced page as shown in, for example, illustration (a) of FIG. 7 is acquired, the reproduced page is divided into a plurality of areas (or a group of divided areas) each of which has a size as indicated by a bold frame. Thereafter, a filter coefficient for each divided area is calculated using an adaptive algorithm such as LMMMSE (Linear Minimum Means Squared Error) method (illustration (b) in FIG. 7), and each divided area is subjected to an equalizing processing. In the equalizing processing, in order to realize an efficient equalizing performance even in an edge portion of each area several extra pixels may be subjected to filter processing and relevant ones of the processed pixels may be extracted as areas after equalized. In this embodiment, though 16-divided areas are shown the present invention is not limited to the 16-divided areas. Further, though each divided area is shown to have the same size the size of the divided area may be changed.

Description will be made of the LMMSE algorithm. As described in a non-patent literature: "Japanese Journal of Applied Physics Vol. 45, No. 2B, 2006, pp. 1079-1083" the LMMSE is an algorithm which calculates a factor coefficient at which the means squared error between equalized signal and ideal signal is minimum. The calculation equation is expressed by Expression (1):

$$w = RdiRii^{-1} \quad (1)$$

where w indicates a filter coefficient determinable by LMMSE, R d i indicates correlation between input pixel and ideal pixel, and R i i indicates autocorrelation of input pixel. Algorithm other than LMMSE may be used as the adaptive algorithm.

Figure 8:
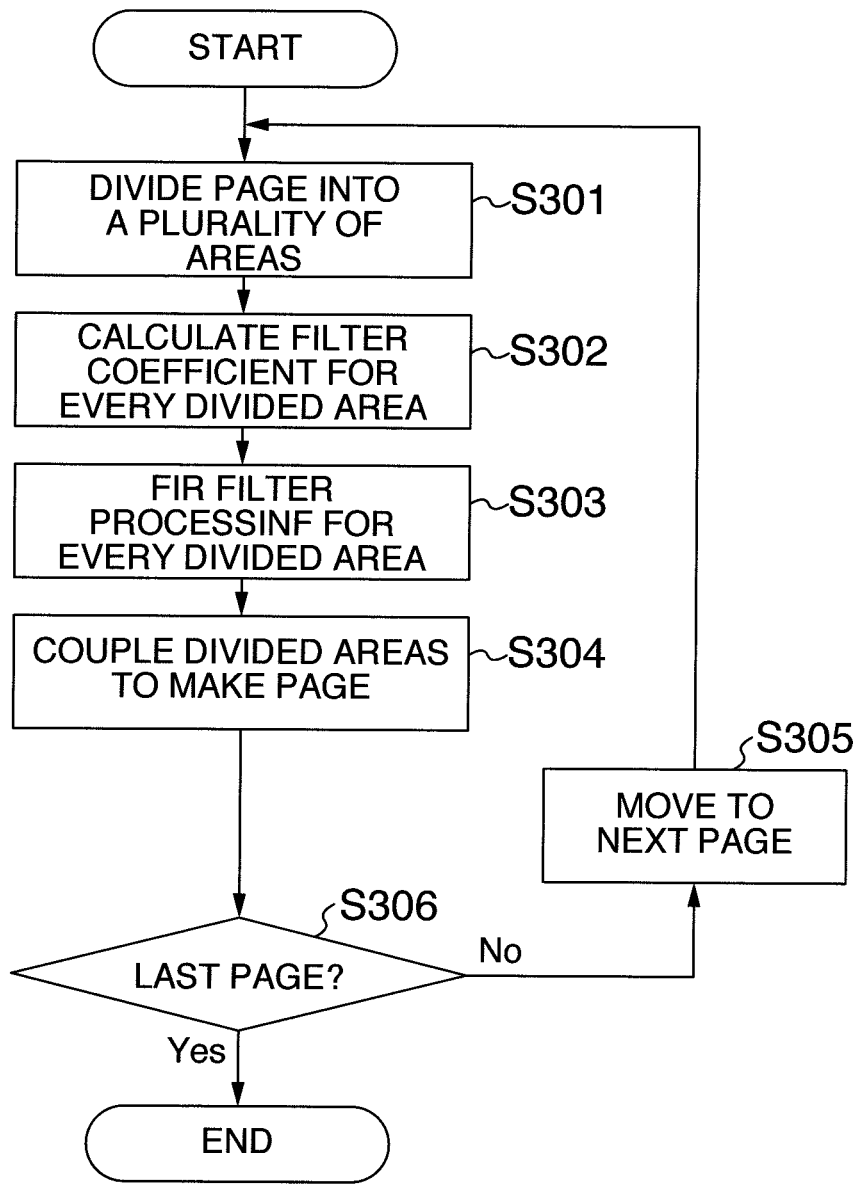
FIG. 8 is a flow diagram showing an example of operation flow according to Embodiment 1.

FIG. 8 shows an example of an operation in which a page is divided into a plurality of areas and each divided area is subjected to adaptive equalizing. At step 301, a page reproduced from the optical information recording medium is at first divided into a plurality of areas each having a certain size. After then, at step 302 an adaptive algorithm such as LMMSE is applied to every divided area to calculate the filter coefficient of the divided area. At step 303, each divided area is subjected to equalizing processing using the filter coefficients of the respective area determined by step 302. At step 304, the divided areas are rearranged at the positions before the dividing and are coupled with each other so as to restore the same condition of the page as before the dividing, thereby making page data. At step 306, it is determined whether the page under processing is last or not. When it is the last page, the processing is ended, and when not the last page, at step 305, the processing proceeds to the next page to execute the operation from the step 301. FIG. 8 exemplifies that the filter processing is performed after all of filter coefficients for every divided area have been calculated. Alternatively, the operation of determining a filter coefficient for each divided area and following a filter processing thereto may be performed to all of the divided areas.

Figure 9:
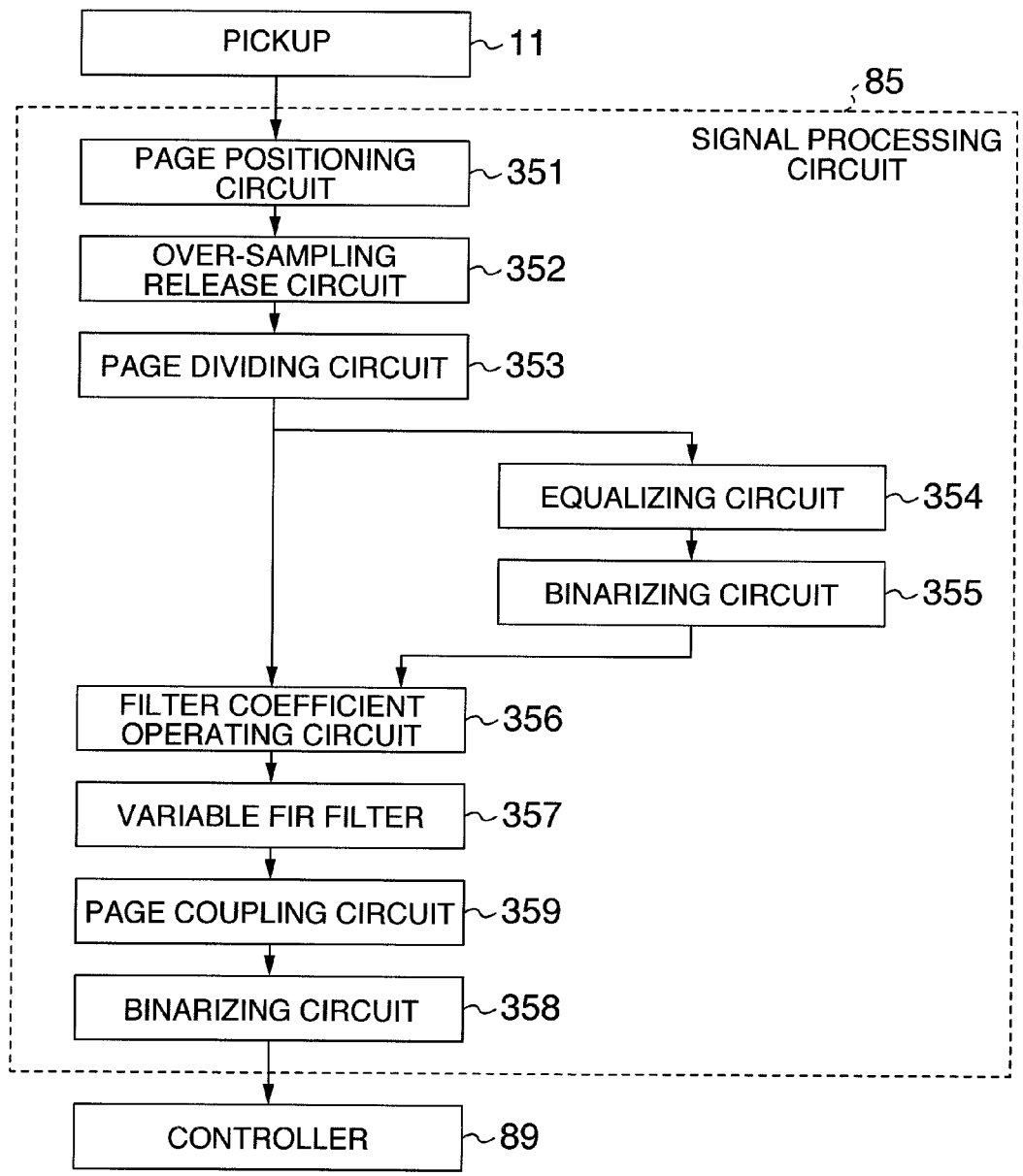
FIG. 9 is a block diagram showing an example of a circuit configuration of an optical information recording and reproducing apparatus in the Embodiment 1.

Subsequently, FIG. 9 shows the configuration of an apparatus according to Embodiment 1. A page data detected by the pickup 11 is adjusted to correct a position difference or the like through a page positioning (alignment) circuit 351. The amount of position difference is calculated based on a known pattern embedded within the page, and so, the position differences in the horizontal direction and in the vertical direction, the rotation difference and the magnification difference are calculated. The page positioning circuit 351 positions a detected image based on the calculated information of such differences. Thereafter, an over-sampling release circuit 352 adjusts one pixel within the page such that the one pixel and either of ON signal or OFF signal in the spatial light modulator 212 in recording may have one-to-one corresponding relation. This is because in order to secure sufficient performance of reproduction even though there is a position difference in the page, the resolution of the light detector 225 is made generally higher than that of the spatial light modulator 212. After that, a page dividing circuit 353 divides the page into a plurality of divided areas each having a certain size and a filter coefficient operating circuit 356 determines a filter coefficient to every divided area. Further, since the filter coefficient operating circuit 356 requires an ideal signal, the output of the page dividing circuit 353 is at the same time transferred to an equalizing circuit 354 for equalizing processing and is then binarized by a binarizing circuit 355 and transferred to the filter coefficient operating circuit 356 as the ideal signal. Further, the binarizing circuit 355 may determine ON and OFF in accordance with a threshold, utilize the Vitabi decoding, or perform binarizing by soft determination decoding of error correction code such as SUM-PRODUCT decoding. When this embodiment is used as a PR equalizer PRML (Partial Response Maximum Likelihood), the binarizing circuit 355 may be followed by a filter which performs convolution so as to provide a desired PR characteristic. A variable FIR filter 357 applies filter processing to the respective divided areas using filter coefficients calculated by the filter coefficient operating circuit 356. Thereafter, a page coupling circuit 358 makes the divided areas couple with each other to restore the condition of the initial page, and a binarizing circuit 358 binarizes the coupled areas into ON and OFF information and transfers the information to the controller 89. In this embodiment, the signal from the binarizing circuit 355 is used as the ideal signal for the filter coefficient operating circuit. Alternatively, however, the filter coefficients may be operated using the above-mentioned known pattern embedded into the page. The binarizing circuit 358 may determine ON and OFF according to the threshold like the binarizing circuit 355, utilize the Vitabi decoding, or perform binarizing by soft determination/decoding of error correction code such as SUM-PRODUCT decoding.

According to this embodiment, it is possible to cope with the difference in reproduction quality and intersymbol interference due to the difference in position within the page, so improving the reproduction quality of the overall page. Parallel processing of adaptive equalizing to the respective divided areas allows high-speed signal reproduction. In this embodiment, though the description has been made based on angle-multiplex holography, the present invention should not be limited to the angle-multiplex system, but the present invention may apply to other hologram recording such as a shift multiplex system and signal processing in an optical information recording medium other than hologram.

Embodiment 2

The description common to that of Embodiment 1 will be omitted hereafter. FIGS. 10A and 10B show an example of a method for dividing a page according to the second embodiment. Like the Embodiment 1 a page is divided into a plurality of areas each having a certain size. The areas which are close in quality with each other are coupled as shown in FIG. 10A to thereby expand the area. The signal quality of the expanded area can be considered as SNR expressed by the following Expression (2) or Expression (3) or the mean luminance, for example.

$$SNR = (\mu ON + \mu OFF)/(\sigma ON + \sigma OFF) \quad (2)$$

$$SNR = (\mu ON + \mu OFF)/(\sigma ON^2 + \sigma OFF^2)^{0.5} \quad (3)$$

where $\mu ON$ and $\mu OFF$ represent mean luminances of ON pixel and OFF pixel, respectively, and $\sigma ON$ and $\sigma OFF$ represent the standard deviations of ON pixel and OFF pixel, respectively. In this embodiment, if areas are similar in signal quality to each other there is a possibility that the areas are coupled even when are not adjacent to each other. For this reason, there is a possibility that the error in the signal quality increases in quantity due to influence of connecting portions between the coupled areas. However, since the occupation ratio of the connecting portion to the expanded area is small, the error quantity is not so problematic in view of the LMMSE algorithm characteristic which provides a minimum mean squared error. To reduce the error quantity it may be considered to use a method of collecting symmetrical areas based on positional information within the page or another method of collecting areas which are simply close in position to each other as shown in FIG. 10B.

Figure 11:
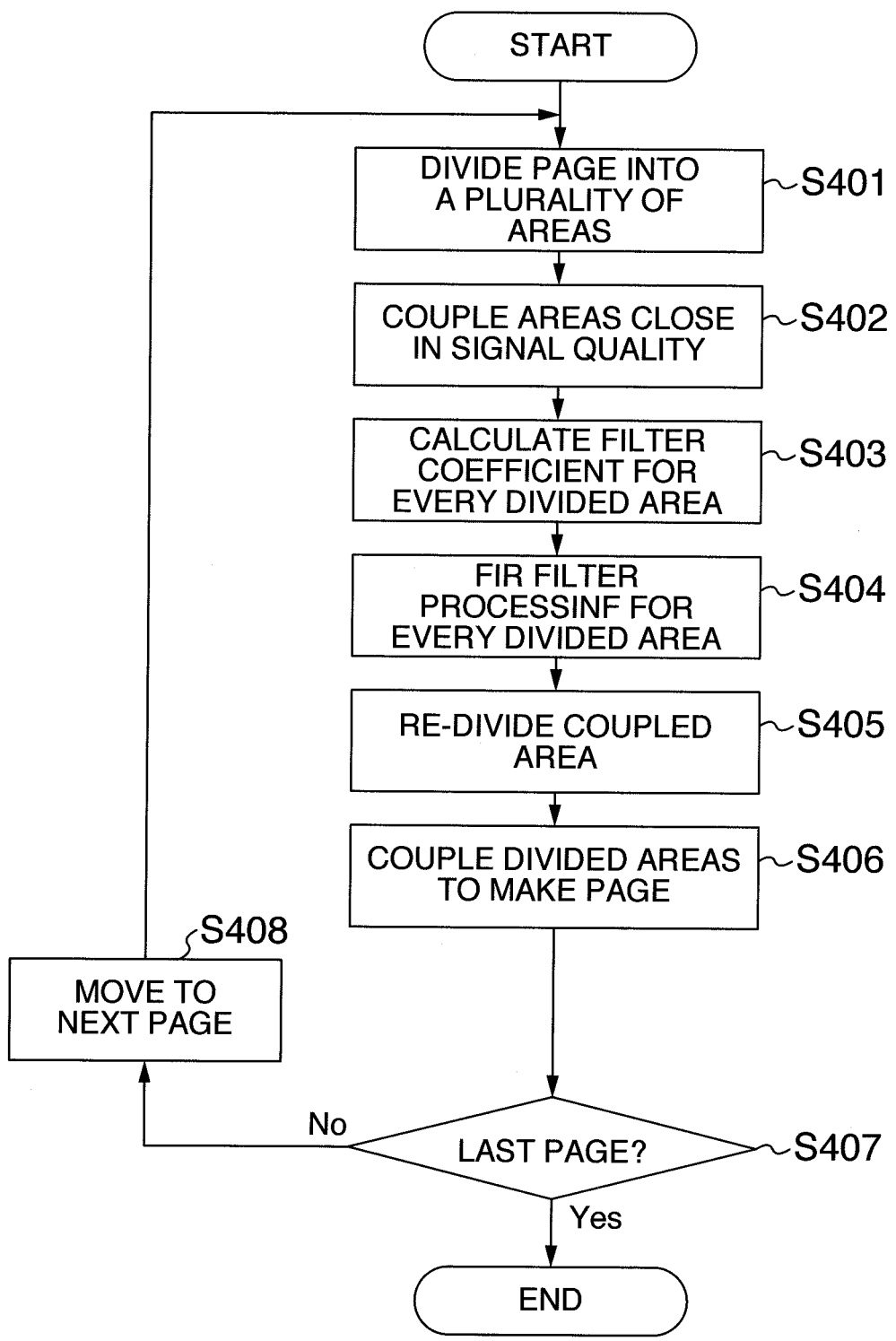
FIG. 11 is a flow diagram showing an example of operation flow in the Embodiment 2.

FIG. 11 shows one example of the operation flow in Embodiment 2. At step 401, a page is divided into a plurality of areas each having a certain size. After then, at step 402, areas which are close in reproduction quality are coupled based on information such as SNR and mean luminance to thereby expand the area for filter coefficient calculation. At step 403, filter coefficients are calculated to every divided area using an algorithm such as LMMSE or the like. At step 404, FIR filter processing is performed to every divided area. At step 405, the area coupled at step 402 is re-divided into a set of areas. At step 406, the set of divided areas are rearranged and coupled in positions before divided so as to restore the condition of page before dividing to thereby make the page in form of data. At step 407, it is determined whether the page under processing is last one. When it is the last page, the processing is terminated. When not the last page, at step 408 the processing is moved to the next page and the operations from step 401 are executed.

Figure 12:
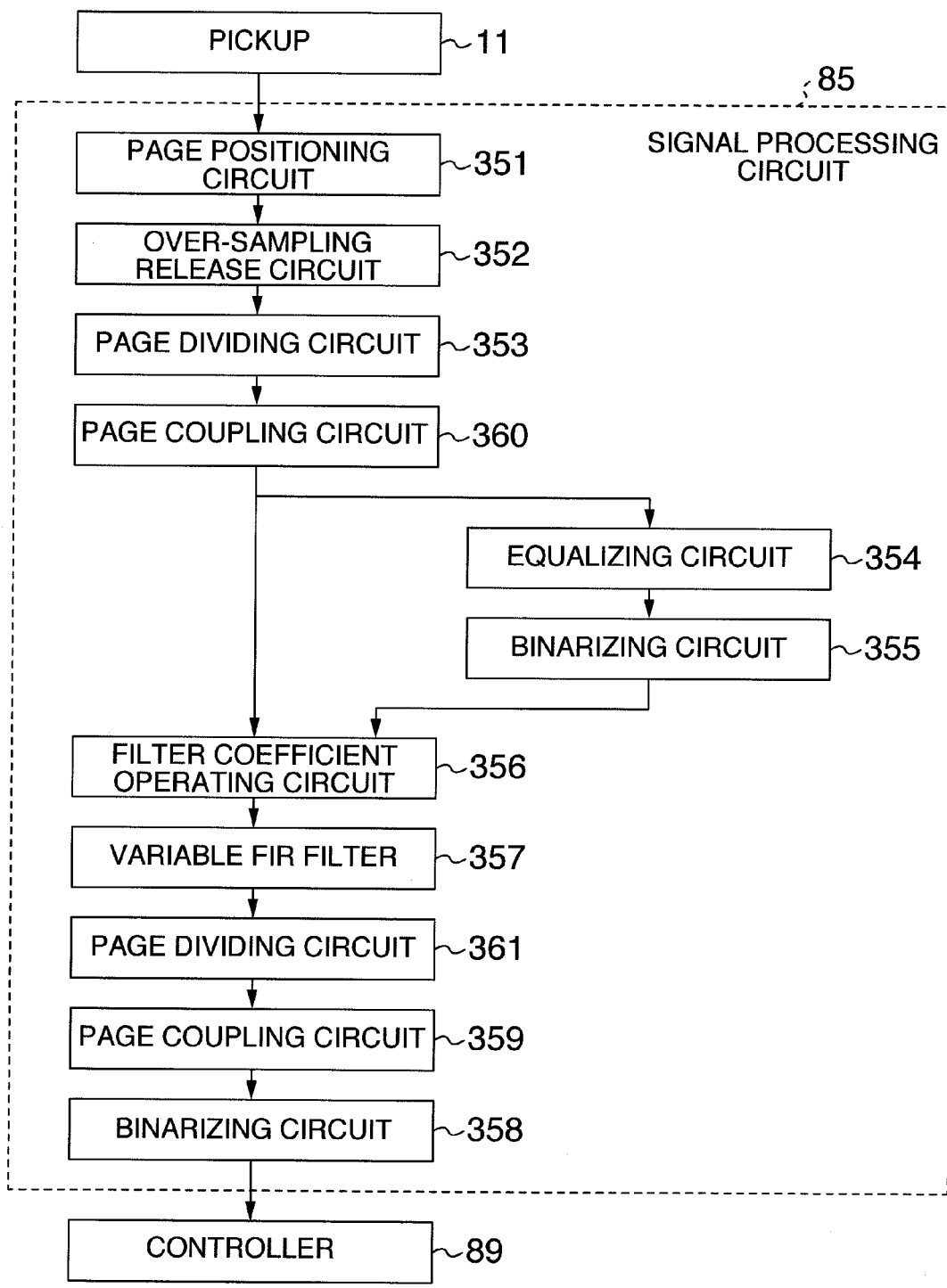
FIG. 12 is a block diagram showing an example of a circuit configuration of an optical information recording and reproducing apparatus in the Embodiment 2.

FIG. 12 shows one example of the configuration of an apparatus according to the second embodiment. The description of portions common to Embodiment 1 will be omitted. In Embodiment 2, after a page is divided into a plurality of areas by the page dividing circuit 353 ones of the divided areas which are close in signal quality are coupled by a page coupling circuit 360. After then, through the apparatus configuration similar to Embodiment 1 a page dividing circuit 361 is arranged subsequent to the variable FIR filter 357 to thereby restore the condition of divided areas before the coupling by the page coupling circuit 360. The divided areas are coupled by the page coupling circuit 359 so as to restore in the condition of the original page. When processed so as to collect divided areas which are close in position information within page the page dividing circuit 361 can be omitted if the page coupling circuit 359 can restore the page without the page dividing circuit 361. Like Embodiment 1, when using the apparatus as a PR equalizer of Partial Response Maximum Likelihood (PRML) the binarizing circuit 355 may be followed by a filter for performing convolution so as to provide a desired PR characteristic.

According to Embodiment 2, in addition to the merits described in Embodiment 1, it is possible to calculate filter coefficients which are higher in precision because divided areas which are close in signal quality are collected to thereby increase the number of samples in determination of one filter coefficient. Since the number of filter coefficients may be reduced it is possible to reduce the circuit scale compared with Embodiment 1 if collected as such.

Embodiment 3

Figure 13:
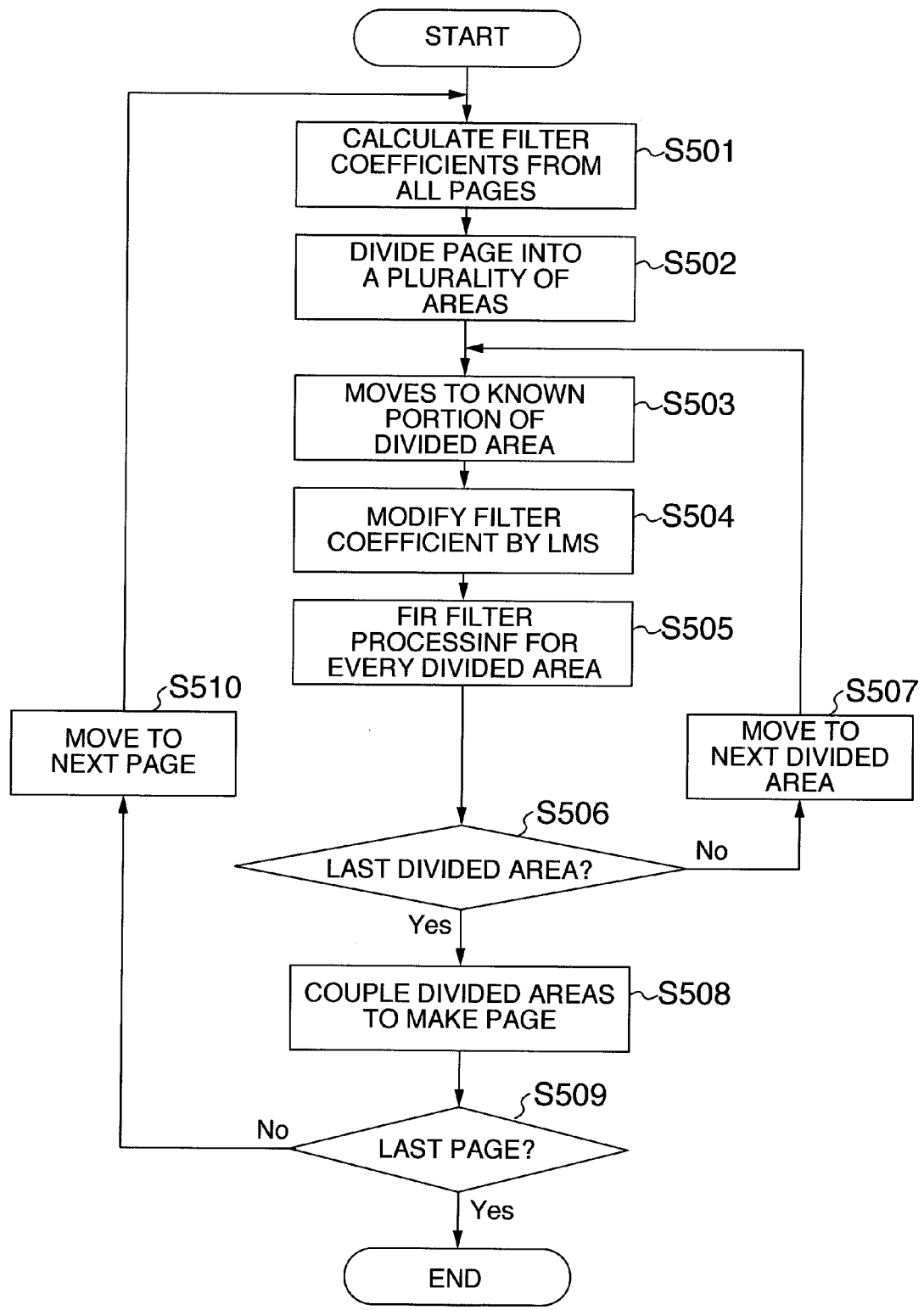
FIG. 13 is a flow diagram showing an example of operation flow according to Embodiment 3.

FIG. 13 shows one example of operation flow according to the third embodiment directed to a method for adaptively equalizing every divided area. In Embodiment 3, after one filter coefficient is calculated from the overall pages the filter coefficient is modified so that it may be the coefficient for every divided area and the modified coefficient is equalized for every divided area. At step 501, one modified filter coefficient is calculated from the overall pages using an adaptive algorithm such as LMMSE or the like. Then, at step 502, the page is divided into a plurality of areas each having a certain size. At step 503, the processing proceeds to a known pattern within the divided area. This known pattern may be the known pattern for calculating the quantity of difference described in Embodiment 1, or may be a known pattern for determining a filter coefficient newly embedded into the page. At step 504, using the filter coefficient calculated at step 501 as an initial value the filter coefficients are modified by the LMS algorithm or the like so as to be filter coefficients for effectively removing intersymbol interference for each divided area. At step 505, every divided area is subjected to a FIR filter processing, and at step 506, it is determined whether the filter processing is for the last dived area. If not so, at step 507, the processing proceeds to the next divided area to return to the processing from step 503. If the filter processing is for the last divided area, at step 508, the divided areas are rearranged and coupled in positions thereof before the dividing so as to restore the same condition of the page as before dividing, thus making the page in the form of data. At step 509, it is determined whether the processing is for the last page. If yes, the processing is terminated. If otherwise, the processing proceeds to the subsequent page, to which the operations beginning at step 501 are repeated.

Figure 14:
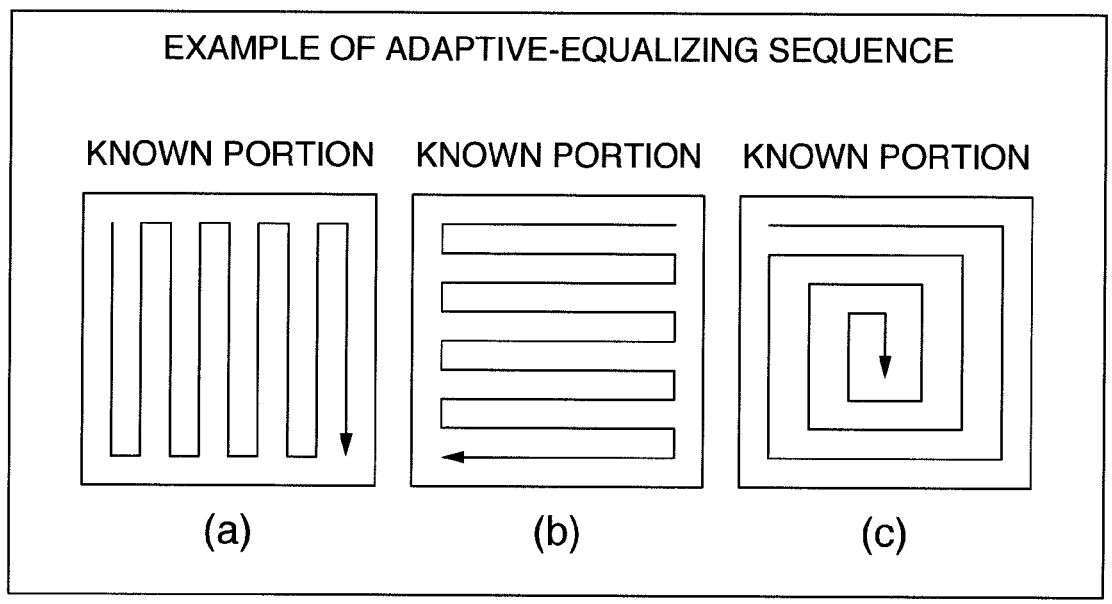
FIG. 14 is illustrations showing an example of the sequence of updating coefficient sets according to adaptive equalizing in the Embodiment 3.

FIG. 14 shows an example of the sequence for updating the filter coefficients by the LMS algorithm. The filter coefficients may be updated by sequentially reading the known portion vertically as shown in illustration (a) of FIG. 14. The updating may be done by sequentially reading the known portion horizontally as shown in illustration (b) of FIG. 14. As the alternative, the filter coefficients may be updated by reading from an outer circumferential portion to the center portion or reversely from the center portion to the outer circumferential portion as shown in illustration (c) of FIG. 14. According to the LMS algorithm, the filter coefficient is updated using the following Expression (4):

$$w(n+1)=w(n)+\mu e(n)i(n) \quad (4)$$

where w (n+1) represents a (n+1)-th filter coefficient, w (n) represents an n-th filter coefficient, µ represents a step-size parameter, e (n) represents the error between the signal equalized with n-th filter coefficient and the ideal signal, and i (n) represents an input applied to the n-th filter circuit.

Figure 15:
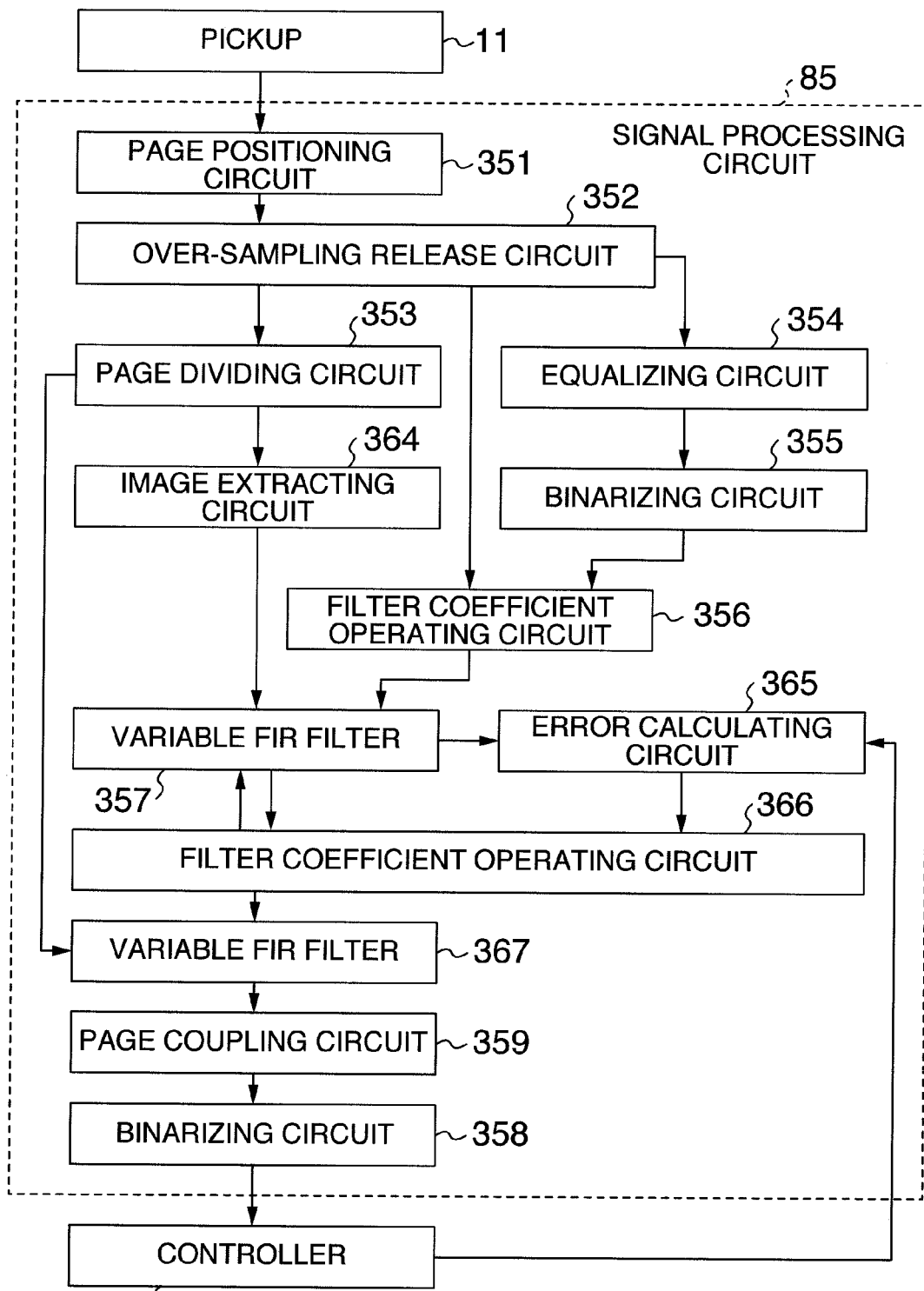
FIG. 15 is a block diagram showing an example of a circuit configuration of an optical information recording and reproducing apparatus in the Embodiment 3.

FIG. 15 shows one example of the configuration of an apparatus according to Embodiment 3. The description of portions common to Embodiment 1 will be omitted hereafter. The over-sampling release circuit 352 is followed by the filter coefficient operating circuit 356 to thereby calculate filter coefficients from the whole page. At this time, since the filter coefficient operating circuit 356 requires an ideal signal the equalizing circuit 354 equalizes the filter coefficient and the binarizing circuit 355 binarizes the equalized filter coefficient to thereby provide the ideal signal. The page dividing circuit 353 divides a signal from the over-sampling circuit 352 into areas each having a certain size. Then an image extracting circuit 364 extracts a known portion within each divided area. The variable FIR filter 357 applies filter processing to the extracted known portion. The output of the filter coefficient operating circuit 356 is used as the initial value of the filter coefficient. An error calculating circuit 365 compares an actual value of the known portion received from the controller 89 with the output of the variable FIR filter 357 to calculate the quantity of error. After then a filter coefficient operating circuit 366 updates the filter coefficient using the above-mentioned LMS algorithm. This processing is done over all pixels of the known portion, and thereby the filter coefficients are updated so as to become filter coefficients for every divided area one after another. Over all of the divided areas, the like processing is applied to calculate filter coefficients for every divided area, using the calculated filter coefficients for every divided area the variable FIR filter 367 subjects to filter processing every divided area of a page divided into a plurality of areas by the page dividing circuit 353, and the page coupling circuit 359 couples the divided areas after filter processing so as to restore the initial condition of the page. Finally, the binarizing circuit 358 binarizes the restored page and transfers the binarized restored page to the controller 89. Further, when like Embodiment 1 the apparatus is used as a PR equalizer for Partial response Maximum Likelihood (PRML) a filter which performs convolution so as to provide a desired PR characteristic may be provided between the controller 89 and the error calculating circuit 365 and subsequent to the binarzing circuit 355. An initial value in updating the filter coefficient by LMS may be the filter coefficient calculated by the overall page, as previously mentioned. In divided areas considered to have a similar characteristic, a filter coefficient updated by LMS may be used as the initial value.

According to Embodiment 3 in addition to the merits and advantages as described in Embodiment 1, since the filter coefficients are calculated using a known portion no error is included in the ideal signal in the adaptive algorithm, and therefore, it will be possible to calculate filter coefficients which are high in precision.

Embodiment 4

Figure 16:
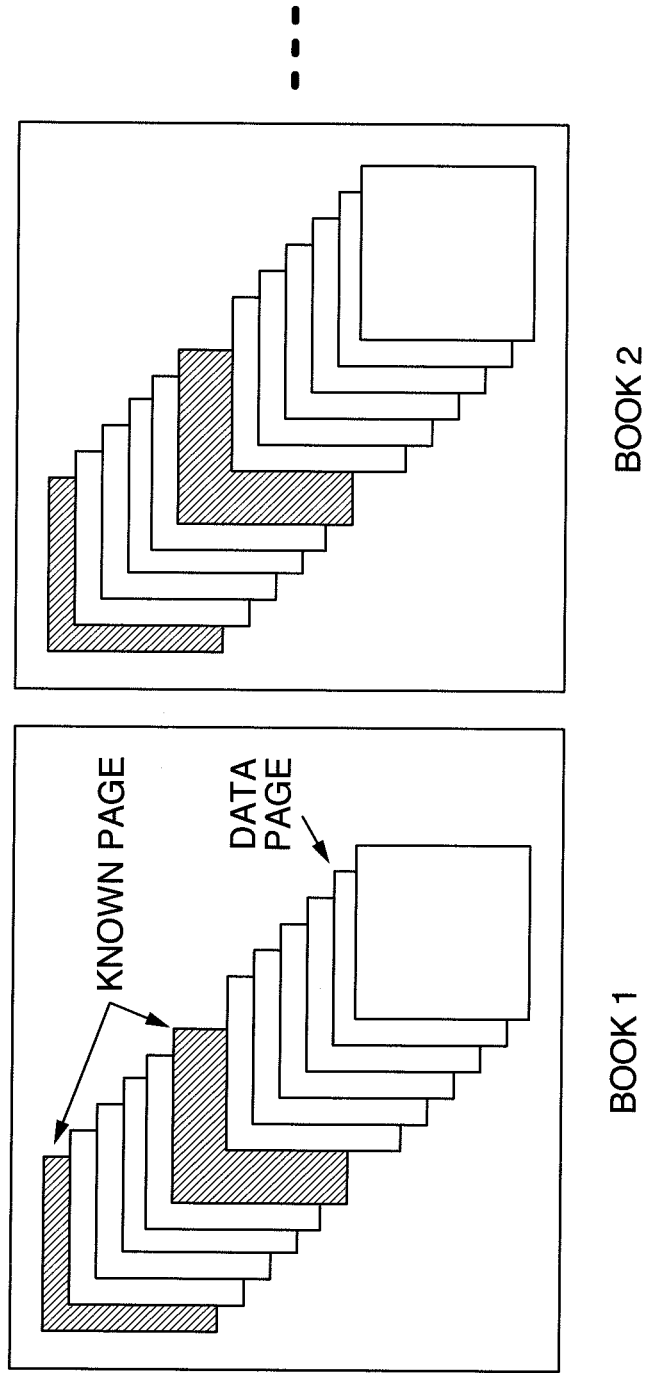
FIG. 16 is illustrations showing an example of periodically recording known pages in Embodiment 4.

FIG. 16 schematically illustrates the fourth embodiment directed to a method of adaptively equalizing every divided area. In Embodiment 4, known pages for calculating filter coefficients are sandwiched in the beginning of a book and between data pages periodically, filter coefficients for every divided area are calculated from the known pages using either one of the methods described in Embodiments 1 to 3. With reference to the equalizing processing in data pages, filter coefficients determined from the known pages are used as they are, and are subjected to filter processing for every divided area. FIG. 16 exemplifies that two known pages are sandwiched within one book. However, the frequency of known page sandwiching is arbitrary and is not limited to the example method of FIG. 16.

Figure 17:
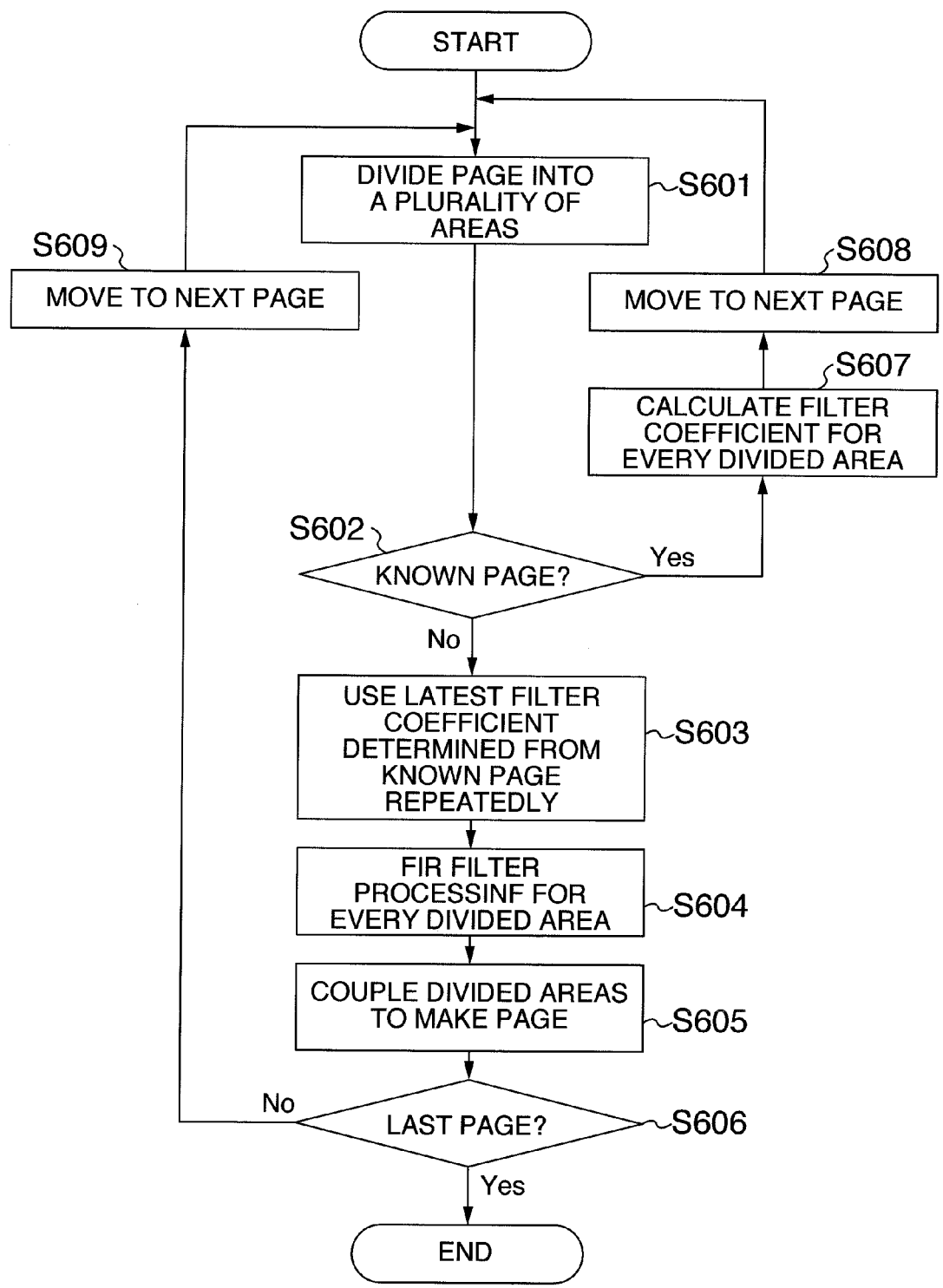
FIG. 17 is a flow diagram showing an example of operation flow in the Embodiment 4.

FIG. 17 shows one example of operation flow according to Embodiment 4. At step 601, a page is divided into a plurality of areas each having a certain size. At step 602, it is determined whether a page under processing is a known page or not. If yes, at step 607, filter coefficients are calculated for every divided area, and at step 608, the processing proceeds to the next page to return to step 601. Further, the determination as to whether a page under processing is a known page may be made based on the number of page or information indicating that the page is a known page and that is previously embedded into the page. At step 602, if the determination is otherwise, at step 603 and step 604, every divided area is subjected to filter processing using the filter coefficients determined for the known page. At step 605, the divided areas are rearranged and coupled in positions before the dividing so as to restore the same condition of page as before the dividing, thus making the page in the form of data. At step 606, it is determined whether the page under processing is the last page. If yes, the processing is terminated. If otherwise, at step 609, the processing proceeds to the next page, and the execution of operation from step 601 is repeated.

Figure 18:
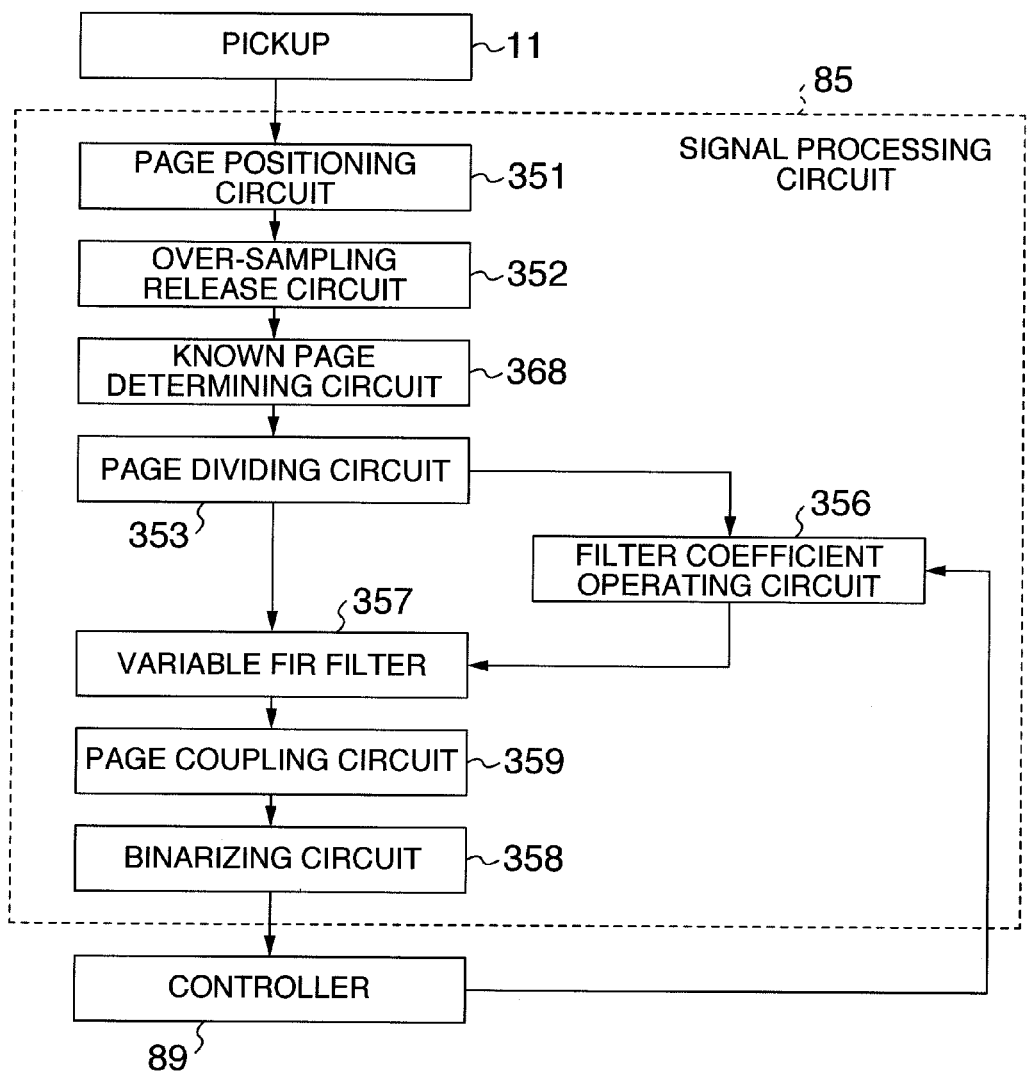
FIG. 18 is a block diagram showing an example of a circuit configuration of an optical information recording and reproducing apparatus in the Embodiment 4.

FIG. 18 shows one example of the configuration of an apparatus according to Embodiment 4. The description of portions similar to those of Embodiment 1 will be omitted hereafter. A known page determining circuit 368 subsequent to the over-sampling release circuit 352 determines whether a page under processing is a known page. After then, the page dividing circuit 353 divides the page into a set of divided areas each of which has a certain size. If the page under processing is the known page in the determination the filter coefficient operating circuit 356 calculates a set of filter coefficients for every divided area. The ideal signal in this case is provided by the controller 89. If the page under processing is not the known page, the variable FIR filter 357 subjects the page to filter processing using a set of filter coefficients calculated by the filter coefficient operating circuit 356 based on the known page. After then, the page coupling circuit 359 couples the divided areas so as to restore the initial condition of the page. The binarizing circuit 358 binarizes the coupled divided areas and transfers binarized page data to the controller 89.

According to Embodiment 4, in addition to the merits and advantages described in Embodiment 1, a set of filter coefficients are calculated using the known portion like Embodiment 3 and further the known portion is rather numerous in sampling number and page number, so that it is possible to calculate filter coefficients which are higher in precision than the Embodiment 3. In this embodiment, the adaptive algorithm is not applied to all pages for execution, but it is applied to only the known pages, so that the reproduction can be speeded up as compared with the other embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information reproducing apparatus for reproducing information utilizing holography, comprising:
a pickup configured to reproduce a two-dimensional signal from an optical information recording medium;
a divider configured to divide a page, represented by the two-dimensional signal reproduced from the pickup, into a set of at least two areas, represented by divided two-dimensional signals;
a filter coefficient operating circuit configured to calculate a filter coefficient for each set of divided two-dimensional signals which has been divided by the divider, such that an error between a set of equalized divided two-dimensional signals and ideal signals is minimized, the set of equalized divided two-dimensional signals and ideal signals corresponding to the set of divided two-dimensional signal;
a filter circuit configured to filter each set of the divided two-dimensional signals, by using the filter coefficient output from the filter coefficient operating circuit;
a coupler configured to couple a set of equalized two-dimensional signals output from the filter circuit; and
a binarizing circuit configured to binarize a coupled two-dimensional signal output from the coupler.

2. An optical information reproducing apparatus according to claim 1, wherein the divider includes a dividing circuit configured to divide an area, represented by reproduced two-dimensional signal output from the pickup, into a set of areas, represented by two-dimensional signals, each area being of a predetermined size.

3. An optical information reproducing method for reproducing information utilizing holography, comprising:

a reproducing step of reproducing a two-dimensional signal from an optical information recording medium;
a dividing step of dividing the reproduced page, represented by a two-dimensional signal, into a set of areas, represented by divided two-dimensional signals;
a filter coefficient operating step of calculating a filter coefficient for each set of divided two-dimensional signals which has been divided by the divider, such that an error between a set of equalized divided two-dimensional signals and ideal signals is minimized, the set of equalized divided two-dimensional signals and the ideal signals corresponding to the set of divided two-dimensional signal;
a filtering step of filtering each set of the divided two-dimensional signals, by using the filter coefficient output from the filter coefficient operating step;
a coupling step of coupling the set of two-dimensional signals equalized in the filtering step; and
a binarizing step of binarizing a two-dimensional signal coupled in the coupling step.

4. The optical information reproducing apparatus according to claim 1,
wherein the filter coefficient operating circuit is configured to use an arbitrary filter coefficient as initial value, and configured to obtain filter coefficients such that a set of areas, represented by two-dimensional signals output from the divider, are equalized to provide the target characteristic; and
wherein the filter circuit is configured to equalize a set of areas, represented by two-dimensional signals output from the divider, by using filter coefficients output from the filter coefficient operating circuit.

5. The optical information reproducing apparatus according to claim 1,
wherein the filter coefficient operating circuit is configured to obtain filter coefficients such that a set of known two-dimensional signals are equalized to provide the target characteristic, the set of known two-dimensional signals being made by dividing the known two-dimensional signal inserted in advance, into the two dimensional signals reproduced from the pickup in order to learn the filter coefficients; and
wherein the filter circuit is configured to equalize a set of areas, represented by two-dimensional signals output from the divider, by using filter coefficients output from the filter coefficient operating circuit.

6. The optical information reproducing apparatus according to claim 1,
wherein the filter coefficient operating circuit is configured to obtain filter coefficients such that an average of errors between filtered two-dimensional signals and the target characteristic becomes minimum when filtering a set of areas, represented by two-dimensional signals output from the divider; and
wherein the filter circuit is configured to equalize a set of areas, represented by two-dimensional signals output from the divider, by using filter coefficients output from the filter coefficient operating circuit.

7. The optical information reproducing method according to claim 3,
wherein the filter coefficient operating step includes using an arbitrary filter coefficient as initial value, and obtaining filter coefficients such that a set of areas, represented by two-dimensional signals divided in the dividing step, are equalized to provide the target characteristic; and
wherein the filtering step includes equalizing a set of areas, represented by two-dimensional signals divided in the dividing step, by using filter coefficients output from the filter coefficient operating step.

8. The optical information reproducing method according to claim 3,
wherein the filter coefficient operating step includes obtaining filter coefficients such that a set of known two-dimensional signals are equalized to provide the target characteristic, the set of known two-dimensional signals being made by dividing the known two-dimensional signals inserted in advance, into the two dimensional signals reproduced in the reproducing step in order to learn the filter coefficients; and
wherein the filtering step includes equalizing a set of areas, represented by two-dimensional signals divided in the dividing step, by using filter coefficients output from the filter coefficient operating step.

9. The optical information reproducing method according to claim 3,
wherein the filter coefficient operating step includes obtaining filter coefficients such that an average of errors between filtered two-dimensional signals and the target characteristic becomes minimum when filtering the set of the areas, represented by two-dimensional signals divided in the dividing step; and
wherein the filtering step includes equalizing a set of areas, represented by two-dimensional signals divided in the dividing step, by using filter coefficients output from the filter coefficient operating step.

10. An optical information reproducing method for reproducing information utilizing holography, comprising:
a reproducing step of reproducing a two-dimensional page data from an optical information recording medium;
a dividing step of dividing an area, represented by a two-dimensional page data reproduced in the reproducing step, into at least a first area and a second area;
a first filter coefficient step of calculating a first filter coefficient corresponding to the first area, such that an error between a first equalized signal and a first ideal signal is minimized, the first equalized signal and the first ideal signal being signals corresponding to the first area;
a first equalizing step of equalizing the first area to provide a first target characteristic, by using the first filter coefficient;
a second filter coefficient step of calculating a second filter coefficient corresponding to the second area, such that an error between a second equalized signal and a second ideal signal is minimized, the second equalized signal and the second ideal signal being signals corresponding to the second area;
a second equalizing step of equalizing the second area to provide a second target characteristic, by using the second filter coefficient; and
a decoding step of decoding the information based on the first area and the second area which have been equalized.

11. An optical information reproducing apparatus for reproducing information utilizing holography, comprising:
a pickup unit configured to reproduce a two-dimensional page data from an optical information recording medium;
a divider unit configured to divide a two-dimensional page data reproduced from the pickup into at least a first area and a second area; and
a first filter coefficient unit configured to calculate a first filter coefficient corresponding to the first area, such that an error between first equalized signal and first ideal signal is minimized, the first equalized signal and the first ideal signal being signal corresponding to the first area;
a first equalizing unit configured to equalize the first area to provide a first target characteristic, by using the first filter coefficient;
a second filter coefficient unit configured to calculate a second filter coefficient corresponding to the second area, such that an error between second equalized signal and second ideal signal is minimized, the second equalized signal and the second ideal signal being signal corresponding to the second area;
a second equalizing unit configured to equalize the second area to provide a second target characteristic, by using the second filter coefficient;
wherein the information is decoded based on the first area and the second area which have been equalized.

12. The optical information reproducing method according to claim 3,
wherein the dividing step includes:
a first dividing step configured to divide a page, represented by a reproduced two-dimensional signal output from the reproducing step, into a set of areas, represented by two-dimensional signals, each of which is of a predetermined size, and
a first coupling step configured to couple a set of two-dimensional signals divided in the first dividing step with a set of two-dimensional signals larger than two-dimensional signals divided in the first dividing step; and wherein the coupling step includes:
a second dividing step configured to re-divide two-dimensional signals coupled in the first coupling step into the condition of a set of two-dimensional signals before being coupled in the first coupling step, and
a second coupling step configured to couple a set of two-dimensional signals divided in the second dividing step, in the condition of two-dimensional signals before divided in the first dividing step.

13. An optical information reproducing apparatus for reproducing information utilizing holography, comprising:
a pickup configured to reproduce a two-dimensional signal from an optical information recording medium;
a divider configured to divide the two-dimensional signal reproduced from the pickup into a set of at least two two-dimensional signals;
an adaptive equalizing circuit configured to equalize the set of the two-dimensional signals output from the divider, to provide a predetermined target characteristic;
a coupler configured to couple a set of equalized two-dimensional signals output from the adaptive equalizing circuit; and
a binarizing circuit configured to binarize a coupled two-dimensional signal output from the coupler;
wherein the adaptive equalizing circuit includes:
a coefficient operating circuit configured to use an arbitrary filter coefficient as initial value, and configured to obtain filter coefficients such that a set of two-dimensional signals output from the divider are equalized to provide the target characteristic, and
a filter configured to equalize a set of two-dimensional signals output from the divider using filter coefficients output from the coefficient operating circuit.

14. The optical information reproducing apparatus for reproducing information utilizing holography of claim 13,
wherein the coefficient operating circuit is configured to obtain filter coefficients such that a set of known two-dimensional signals are equalized to provide the target characteristic, the set of known two-dimensional signals being made by dividing the known two-dimensional signal inserted in advance into the two dimensional signals reproduced from the pickup in order to learn the filter coefficients.

15. The optical information reproducing apparatus for reproducing information utilizing holography of claim 13, wherein a coefficient operating circuit is configured to obtain filter coefficients such that an average of errors between filtered two-dimensional signals and the target characteristic becomes minimum when filtering a set of two-dimensional signals output from the divider.

16. An optical information reproducing method for reproducing information utilizing holography, comprising:
   a reproducing step of reproducing a two-dimensional signal from an optical information recording medium;
   a dividing step of dividing the reproduced two-dimensional signal into a set of two-dimensional signals;
   an adaptive equalizing step of equalizing the set of two-dimensional signals divided in the dividing step to provide a predetermined target characteristic;
   a coupling step of coupling the set of two-dimensional signals equalized in the adaptive equalizing step; and
   a binarizing step of binarizing a two-dimensional signal coupled in the coupling step;
   wherein the adaptive equalizing step includes:
   a coefficient operating step to use an arbitrary filter coefficient as initial value, and to obtain filter coefficients such that a set of two-dimensional signals divided in the dividing step are equalized to provide the target characteristic; and
   a filtering step to equalize a set of two-dimensional signals divided in the dividing step using filter coefficients output from the coefficient operating step.

17. The optical information reproducing method for reproducing information utilizing holography of claim 16, wherein the coefficient operating step obtains filter coefficients such that a set of known two-dimensional signals are equalized to provide the target characteristic, the set of known two-dimensional signals being made by dividing the known two-dimensional signals inserted in advance into the two dimensional signals reproduced in the reproducing step in order to learn the filter coefficients.

18. The optical information reproducing method for reproducing information utilizing holography of claim 16, wherein the coefficient operating step obtains filter coefficients such that an average of errors between filtered two-dimensional signals and the target characteristic becomes minimum when filtering the set of the two-dimensional signals divided in the dividing step.

* * * * *